United States Patent
Kimura

(10) Patent No.: US 7,319,655 B2
(45) Date of Patent: Jan. 15, 2008

(54) DIFFRACTIVE OPTICAL ELEMENT, OBJECTIVE OPTICAL SYSTEM, OPTICAL PICK-UP DEVICE AND OPTICAL INFORMATION RECORDING REPRODUCING APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 579 days.

(21) Appl. No.: 11/002,411

(22) Filed: Dec. 2, 2004

(65) Prior Publication Data

US 2005/0122882 A1 Jun. 9, 2005

(30) Foreign Application Priority Data

Dec. 9, 2003 (JP) ............................. 2003-410506

(51) Int. Cl.
*G11B 7/00* (2006.01)
(52) U.S. Cl. .............................. 369/112.01; 369/112.03
(58) Field of Classification Search ........... 369/112.01, 369/112.02, 112.1, 112.03, 112.05
See application file for complete search history.

(56) References Cited

U.S. PATENT DOCUMENTS 6,201,780 B1 * 3/2001 Katayama .............. 369/112.19

* cited by examiner

*Primary Examiner*—Nabil Hindi
(74) *Attorney, Agent, or Firm*—Cohen Pontani Lieberman & Pavane LLP

(57) ABSTRACT

A diffractive optical element, comprises a first diffractive structure to generate $n_{11}$-th order diffracted ray when a first light flux having $\lambda 1$ (nm) of a wavelength comes in and to generate $n_{21}$-th order diffracted ray ($n_{11} \geq n_{21}$) when a second light flux having $\lambda 2$ (nm) ($\lambda 2 > \lambda 1$) comes in; and a second diffractive structure to generate $n_{12}$-th order diffracted ray when the first light flux comes in and to generate $n_{22}$-th order diffracted ray ($n_{12} \geq n_{22}$) when the second light comes in. The diffractive optical element satisfies the following formula: $\delta\phi_{A12} \neq \delta\phi_{B12}$, where $\delta\phi_{A12} = \{n_{11} \cdot \lambda_1/(N_{11}-1)\}/\{n_{21} \cdot \lambda_2/(N_{21}-1)\}$, and $\delta\phi_{B12} = \{n_{12} \cdot \lambda_1/(N_{12}-1)\}/\{n_{22} \cdot \lambda_2/(N_{22}-1)\}$, wherein $N_{11}$, $N_{21}$ are refractive index of the first diffractive structure respectively for $\lambda_1$ and $\lambda_2$, and $N_{12}$, $N_{22}$ are refractive index of the second diffractive structure respectively for $\lambda_1$ and $\lambda_2$.

31 Claims, 5 Drawing Sheets

DIFFRACTIVE OPTICAL ELEMENT, OBJECTIVE OPTICAL SYSTEM, OPTICAL PICK-UP DEVICE AND OPTICAL INFORMATION RECORDING REPRODUCING APPARATUS

BACKGROUND OF THE INVENTION

The present invention relates to a diffractive optical element, objective optical system, optical pick-up device and optical information recording reproducing apparatus, and particularly, to an optical pick-up device and optical information recording reproducing apparatus by which, by using light fluxes projected from light sources of different wavelengths, the information can be recorded and/or reproduced for optical information recording media, and to a diffractive optical element and objective optical system appropriate when used for them.

Conventionally, an optical pick-up device which can record/reproduce for a plurality of kinds of optical disks having different recording densities, is well-known. For example, there is a device by which a DVD (Digital Versatile Dik) and a CD (Compact Disk) are recorded/reproduced by using an optical pick-up device. Further, recently, as an optical disk having different recording densities, an optical pick-up device which is compatible with a high density optical disk (hereinafter, optical disks which use a blue violet laser light source as a laser light source for recording/reproducing, are generally called "high density optical disk"), using the blue violet laser light source (for example, a blue violet semiconductor laser or a blue violet SHG laser), and the conventional DVD, further, also with the CD, is required.

As the optical pick-up device having the compatibility with the high density optical disk and the DVD, as written in the following Patent Documents, a technology using a diffractive optical element on which a diffractive structure composed of a plurality of ring-shaped zones around the optical axis is formed, is well-known.

| [Patent Document 1] | Tokkkai 2001-60336 |
| [Patent Document 2] | Tokkkai 2002-298422 |
| [Patent Document 3] | Tokkkai 2001-93179 |

The technology written in the above Patent Documents is a technology which uses the lower diffraction order beam than the diffraction order of the beam for the recording/reproducing of the high density optical disk as the recording/reproducing beam, in a manner that a second order (or a third order) diffractive-light is used as the beam for the recording/reproducing of the high density optical disk, and a first order (or a second order) diffractive light is used as the beam for recording/reproducing of DVD. According to this technology, to the recording/reproducing beam of respective optical disk, while securing the high diffraction efficiency, the variation of the focus position to the minute wavelength change in the blue violet wavelength range can be suppressed.

In this manner, for the purpose to secure the high diffraction efficiency to both of optical disks having the large wavelength difference of the beam for the recording/reproducing, when a wavelength of the beam for the recording/reproducing of the high density optical disk is $\lambda_1$, and a wavelength of the beam for the recording/reproducing of DVD is $\lambda_2$, and the refractive indexes of the diffractive optical element to the wavelengths $\lambda_1$, $\lambda_2$ are respectively $N_1$, $N_2$, it is necessary that a combination of the diffraction order n1 of the wavelength of the beam for the recording/reproducing of the high density optical disk, and the diffraction order $n_2$ of the wavelength of the beam for the recording/reproducing of DVD, is selected, so that a ratio $\delta\phi_D$ of the optical path difference added to the light flux of the wavelength $\lambda_1$ by the diffractive structure defined by the following equation $$\delta\phi_D = \{n_1 \cdot \lambda_1/(N_1-1)\}/\{n_2 \cdot \lambda_2/(N_2-1)\} \quad (18)$$

and the optical path difference added to the light flux of the wavelength $\lambda_2$ is a value close to 1.

However, in the diffractive sructure which generates the diffraction light of the combination of the diffraction order $n_1$ and the diffraction order $n_2$, because a changing amount of the spherical aberration per unit wavelength becomes large, the selection of the laser light source becomes necessary, and there are a problem which results in, an increase of the production cost of the laser light source, and an increase of the production cost of the optical pick-up device, and a problem that, because the spherical aberration of the objective optical system largely changes by the wavelength change of the laser light source following the temperature change, the stable recording/reproducing characteristic for the high density optical disk can not be obtained.

Because the changing amount of the spherical aberration per such a unit wavelength change is increased in proportion to 4th powers of a numerical aperture (NA) of the objective optical system, particularly, in the objective optical system of the numerical aperture (NA) 0.85 and the high density optical disk of a standard using a protective layer of 0.1 mm (hereinafter, called 0.1 mm standard), as represented by a blue ray disk which is a standard of the high density optical disk, the above problems are more actualized.

SUMMARY OF THE INVENTION

In view of problems of such a conventional technology, the present invention is attained, and the object of the present invention is to provide an optical pick-up device by which, by using the light fluxes from a plurality of kinds of light sources having a large wavelength difference, the recording and/or reproducing of the information can be appropriately conducted on a plurality of kinds of optical disks having the different recording density, and the allowance to the wavelength of the laser light source can be largely secured, an optical information recording reproducing apparatus and the diffractive optical element using for it, and the objective optical system. Further, to provide the optical pick-up device, by using the light fluxes from a plurality of kinds of light sources having the large wavelength difference, by which the recording and/or reproducing of the information can be appropriately conducted on a plurality of kinds of optical disks having the different recording density, and even when the temperature is changed, the stable recording and/or reproducing of the information can be conducted, and the optical information recording reproducing apparatus and the diffractive optical element using for it, and the objective optical system, is also the object of the present invention.

(Means for Solving the Problems)

The diffractive optical element written in item 1 is a diffractive optical element characterized in that: it has at least one optical surface on which the first diffractive structure which, when the first light flux of the wavelength $\lambda_1$ (nm) is incident, generates the diffraction light of $n_{11}$ order, and when the second light flux of the wavelength $\lambda_2$ (nm) ($\lambda_2 > \lambda_1$) is incident, which generates the diffraction light of $n_{21}$-order ($n_{11} \geq n_{21}$), is formed, and at least one optical surface on which the second diffractive structure, when the first light flux of the wavelength $\lambda_1$ (nm) is incident, which generates the diffraction light of $n_{12}$-order, and when the second light flux of the wavelength $\lambda_2$ (nm) ($\lambda_2 \geq \lambda_1$) is incident, which generates the diffraction light of $n_{22}$-order ($n_{12} \geq n_{22}$), is formed, and satisfies the following equation (1).

$$\delta\phi_{A12} \neq \delta\phi_{B12} \qquad (1)$$

Where, $\delta\phi_{A12} = \{n_{11} \cdot \lambda_1/(N_{11}-1)\}/\{n_{21} \cdot \lambda_2/(N_{21}-1)\}$ (2)

$\delta\phi_{B12} = \{n_{12} \cdot \lambda_1/(N_{12}-1)\}/\{n_{22} \cdot \lambda_2/(N_{22}-1)\}$ (3)

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$.

In the invention written in item 1, for example, by an action of the first diffractive structure, the correction of the spherical aberration due to the difference of the protective layer thickness between 0.1 mm standard high density optical disk and DVD, or the correction of the spherical aberration generated due to the wavelength dispersion by the wavelength difference between the blue violet wavelength and the red wavelength, or the variance of the focus position to the minute wavelength change in the blue violet wavelength range can be suppressed small. However, because, in the diffractive structure, generally, the wavelength dependency of the spherical aberration is large, the spherical aberration change to the wavelength change of the incident light flux of about ±10 nm becomes large. Particularly, to secure the diffraction efficiency to the light having the large wavelength difference like as between the blue violet wavelength and the red wavelength, so that the value of the above expression (18) is a value close to 1, when the diffraction order of respective light is selected, or in the high density optical disk of 0.1 mm standard using the objective optical system of NA 0.85, the allowance to the wavelength of the blue violet laser light source becomes severe, and further, when the wavelength of the blue violet laser light source is changed following the temperature change, the stable recording/reproducing characteristic for the high density optical disk can not be obtained.

Then, in the diffractive optical element according to the present invention, a second diffractive structure in which a ratio $\delta\phi_{B12}$ of the optical path length of the wavelength $\lambda_1$ and wavelength $\lambda_2$ is different from the ratio $\delta\phi_{A12}$ of the optical path length in the above first diffractive structure, is provided. By using the difference between the diffraction actions of the first diffractive structure and the second diffractive structure, the wavelength dependency of the spherical aberration of the first diffractive structure in the blue violet wavelength range can be controlled, or suppressed small. Hereby, an increase of a yield in the mass production of the blue violet laser light source, and a reduction of the production cost of the blue violet laser light source or optical pick-up device become possible. Further, even when the temperature is changed, a stable recording/reproducing of the information on the high density optical disk can also be conducted.

DETAILED DESCRIPTION OF THE PREFERRED EMBODIMENT

Figure 1:
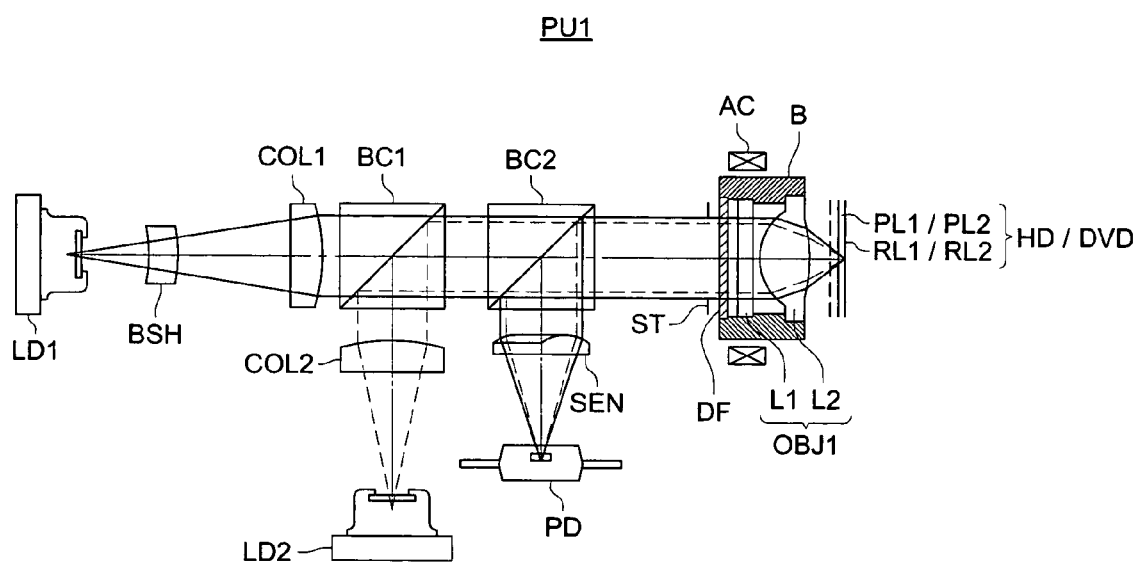
FIG. 1 is an outline structural view of the first optical pick-up device PU1 according to the present embodiment.

Firstly, a preferable examples following Item 1 are described as follows.

The diffractive optical element written in item 2 is characterized in that: it has at least one optical surface on which the first diffractive structure which generates the diffraction light of $n_{11}$-order ($n_{11} \geq n_{21}$), is formed, when the first light flux of the wavelength $\lambda_1$ (nm) is incident, and at least one optical surface on which the second diffractive structure which generates the diffraction light of $n_{22}$-order ($n_{12} \geq n_{22}$), is formed, when the second light flux of the wavelength $\lambda_2$ (nm) ($\lambda 2 > \lambda 1$) is incident, and satisfies the following equation (4).

$$n_{11} \neq n_{12} \qquad (4)$$

Further, to attain the above-described problems, in the diffractive optical element of item 2, by making different the order $n_{11}$ of the diffraction light generated when the light flux of the wavelength $\lambda_1$ passes the above first diffractive structure, from the order $n_{12}$ of the diffraction light generated when the light flux of the wavelength $\lambda_1$ passes the above second diffractive structure, the spherical aberration change to the wavelength change of the incident light flux of about ±10 nm in the blue violet wavelength range, is suppressed small and the allowance to the oscillation wavelength of the blue violet laser light source is softened. Hereby, an increase of the yield in the mass production of the blue violet laser light source, and a reduction of the production cost of the blue violet laser light source or the optical pick-up device become possible. Further, even when the temperature is changed, the stable recording/reproducing of the information on the high density optical disk can also be conducted.

The diffractive optical element written in item 3 is a diffractive optical element characterized in that: it has at least one optical surface on which the first diffractive structure which generates the diffraction light of $n_{11}$-order, is formed, when the first light flux of the wavelength $\lambda_1$ (nm) is incident, and which generates the diffraction light of $n_{21}$-order ($n_{11} \geq n_{21}$), when the second light flux of the wavelength $\lambda_2$ (nm) ($\lambda_2 > \lambda_1$) is incident, and at least one optical surface on which the second diffractive structure which generates the diffraction light of $n_{12}$-order, is formed, when the first light flux of the wavelength $\lambda_1$ (nm) is incident, and which generates the diffraction light of $n_{22}$-order ($n_{12} \geq n_{22}$), when the second light flux of the wavelength $\lambda_2$ (nm) ($\lambda_2 > \lambda_1$) is incident, and satisfies the following equation (5).

$$\{INT(\delta\phi_{A12}) - \delta\phi_{A12}\} \cdot \{INT(\delta\phi_{B12}) - \delta\phi_{B12}\} < 0 \qquad (5)$$

Where, $\delta\phi_{A12} = \{n_{11} \cdot \lambda_1/(N_{11}-1)\}/\{n_{21} \cdot \lambda_2/(N_{21}-1)\}$ (2)

$\delta\phi_{B12} = \{n_{12} \cdot \lambda_1/(N_{12}-1)\}/\{n_{22} \cdot \lambda_2/(N_{22}-1)\}$ (3)

and N11, N21 are respectively the refractive indexes of the first diffractive structure to respective $\lambda_1$, $\lambda_2$, and $N_{12}$, $N_{22}$ are respectively the refractive indexes of the second diffractive structure to respective $\lambda_1$, $\lambda_2$, and INT(X) is an integer closest to X.

Further, to attain the above problems, in the diffractive optical element written in item 3, because the above equation (5) is satisfied, when $\delta\phi_{X12}$ (where, X is A or B) is a ratio of the optical path length of the wavelength $\lambda_1$ and the wavelength $\lambda_2$ of the i-th diffractive structure (where, i is 1 or 2), the diffractive structure whose sign of $\{INT(\delta\phi_{X12})-\delta\phi_{X12}\}$ is negative, when the wavelength of the incident light flux is changed to the long wavelength side, has the wavelength dependency of the spherical aberration in which the spherical aberration changes to the over correction direction, on the one hand, the diffractive structure whose sign of $\{INT(\delta\phi_{X12})-\delta\phi_{X12}\}$ is positive, has, when the wavelength of the incident light flux is changed to the long wavelength side, the wavelength dependency of the spherical aberration in which the spherical aberration changes to the under correction direction.

When the diffractive structure whose signs of the wavelength dependency of such a spherical aberration are different from each other is provided, the wavelength dependency of the spherical aberration to the wavelength change of the incident light flux of about ±10 nm in the blue violet wavelength range, can be controlled, or suppressed small. Hereby, an increase of the yield in the mass production of the blue violet laser light source, and a decrease of the production cost of the blue violet laser light source or the optical pick-up device become possible. Further, even when the temperature is changed, the stable recording/reproducing of the information on the high density optical disk can also be conducted.

Hereupon, in the diffractive optical element written in items 1 to 3, to control the wavelength dependency of the spherical aberration of the first diffractive structure, or suppress small by the second diffractive structure, when the optical path difference added to the wave-front transmitting the first diffractive structure and the second diffractive structure is expressed by the optical path difference function defined by "math-2" which will be described later, it is preferable that 4th-order optical path difference function coefficient $B_{4A}$ of the first diffractive structure, and 4-order optical path difference function coefficient $B_{4B}$ of the second diffractive structure, respectively have a finite value which is not zero, and further, satisfy the following relationship.

$$B_{4A} \cdot B_{4B} < 0 \tag{5A}$$

The diffractive optical element written in item 4 is characterized in that: in the invention written in any one of items 1 to 3, it satisfies any one of the following expressions (6) and (7).

$$|INT(\delta\phi_{A12}) - \delta\phi_{A12}| < 0.4 \tag{6}$$

$$|INT(\delta\phi_{B12}) - \delta\phi_{B12}| < 0.4 \tag{7}$$

Where, $$(\delta\phi_{A12}) = \{n_{11} \cdot \lambda_1/(N_{11}-1)\}/\{n_{21} \cdot \lambda_2/(N_{21}-1)\} \tag{2}$$

$$(\delta\phi_{B12}) = \{n_{12} \cdot \lambda_1/(N_{12}-1)\}/\{n_{22} \cdot \lambda_2/(N_{22}-1)\} \tag{3}$$

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X.

When satisfies any one of expression (6) and expression (7), both of diffraction efficiencies of the first diffractive structure or the second diffractive structure to the first light flux and the second light flux can be heightened. To heighten both of diffraction efficiencies of the first diffractive structure and the second diffractive structure to the first light flux and the second light flux, it is preferable that both of the expression (6) and expression (7) are satisfied.

The diffractive optical element written in item 5 is characterized in that: in the invention written in any one of items 1 to 4, both of the first diffractive structure and the second diffractive structure are structured by a plurality of concentric circular ring shaped zones divided by step difference in the optical axis direction, and the depth $d_1$ of the step difference closest to the optical axis in the ring shaped zones of the first diffractive structure and the depth $d_2$ of the step difference closest to the optical axis in the ring shaped zones of the second diffractive structure satisfy the following expression (8).

$$d_1 \neq d_2 \tag{8}$$

The condition of the expression (8) corresponds to that the production wavelengths of the first diffractive structure and the second diffractive structure are made different from each other. Hereby, because the diffraction actions of the first diffractive structure and the second diffractive structure can be made different from each other, the wavelength dependency of the spherical aberration to a wavelength change of the incident light flux of about ±10 nm in the blue violet wavelength region can be controlled or suppressed small.

The diffractive optical element written in item 6 is characterized in that: in the invention written in any one of items 1 to 5, it satisfies the following expression (9) and expression (10).

$$|INT(\delta\phi_{A12}) - \delta\phi_{A12}| > 0.07 \tag{9}$$

$$|INT(\delta\phi_{B12}) - \delta\phi_{B12}| < 0.07 \tag{10}$$

Where, $\delta\phi_{A12} = \{n_{11} \cdot \lambda_1/(N_{11}-1)\}/\{n_{21} \cdot \lambda_2/(N_{21}-1)\}$ (2)

$\delta\phi_{B12} = \{n_{12} \cdot \lambda_1/(N_{12}-1)\}/\{n_{22} \cdot \lambda_2/(N_{22}-1)\}$ (3)

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X.

When the expression (9) is satisfied, even when the correction of the spherical aberration due to the difference of the thickness of protective layer between the high density optical disk of 0.1 mm standard and DVD, or the correction of the spherical aberration generated due to the wavelength dispersion by the wavelength difference between the blue violet wavelength and the red wavelength is conducted, by the action of the first diffractive structure, because the changing amount of the spherical aberration per unit wavelength change of the first diffractive structure to the wavelength change of the incident light flux of ±about 10 nm in the blue violet wavelength range can be made not to become too large, the wavelength dependency of the spherical aberration of the first diffractive structure by the second diffractive structure can be controlled, or the burden of the correction can be reduced, thereby, the design work becomes easy. On the one hand, when the expression (10) is satisfied, because the diffraction angles of the first light flux and the second light flux in the second diffractive structure can be made almost equal, any influence is not given to the spherical aberration characteristic of the wavelength $\lambda_1$ and the wavelength $\lambda_2$, and only the spherical aberration of wavelength $\lambda_1 \pm 10$ nm can be finely controlled or corrected.

The diffractive optical element written in item 7 is characterized in that: in the invention written in any one of items 1 to 6, it satisfies the following expression (11) to expression (13).

$$\lambda_2/\lambda_1 > 1.3 \tag{11}$$

$$n_{11} > n_{21} \tag{12}$$

$$n_{12} > n_{22} \tag{13}$$

According to the invention of item 7, in the case where the wavelength ratio of the first light flux and the second light flux is larger than 1.3 as in the expression (11), when, as the recording/reproducing beam for DVD, the diffraction light of the diffraction order lower than the recording/reproducing beam for the high density optical disk is used, the high diffraction efficiency can be secured in respective wavelength ranges of the optical disk. In this manner, the diffractive structure determined so as to use the diffraction light whose diffraction order is different, as the recording/reproducing beam of respective optical disks, is, as compared to a case where the diffraction light of the same diffraction order is used, the wavelength dependency of the spherical aberration becomes large, however, in the diffractive optical element of the present invention, because a structure, by the second diffractive structure, the wavelength dependency of the spherical aberration to the wavelength change of the incident light flux of ±about 10 nm in the blue violet wavelength range is controlled, or suppressed small, is adopted, the allowance to the oscillation wavelength of the blue violet laser light source can be softened. Further, even when the temperature is changed, the recording/reproducing of the information on the high density optical disk can also be stably conducted.

The diffractive optical element written in item 8 is characterized in that: in the invention written in any one of items 1 to 7, the wavelength $\lambda_1$ is within the range of 350 nm to 450 nm, and the wavelength $\lambda_2$ is within the range of 600 nm to 700 nm, and when i is 1 or 2, a combination of $n_{1i}$ and $n_{2i}$ is any one of $(n_{1i}, n_{2i})$=(1, 1), (2, 1), (3, 2), (4, 2), (5, 3), (6, 4), (7, 4), (8, 5), (9, 6), (10, 6) (however, a combination of $n_{11}=n_{12}$ is excluded). When these combinations are selected, the high diffraction efficiency can be maintained in the wavelength ranges of respective optical disks. Further, even when the diffraction order $n_{1i}$, $n_{2i}$ are larger than 10, there is a combination of the diffraction order by which the high diffraction efficiency can be maintained in each of wavelength regions of respective optical disks, however, in that case, because a variation of the diffraction efficiency to the wavelength change of ±about 10 (nm) from the reference wavelength $\lambda_1$ is too large, it is not preferable.

The diffractive optical element written in item 9 is characterized in that: in the invention written in any one of items 1 to 7, the first diffractive structure generates the diffraction light of $n_{13}$-order ($n_{12} \geq n_{13}$) when the third light flux of the wavelength $\lambda_3$ (nm) ($\lambda_3 > \lambda_2$) is incident, and the second diffractive structure generates the diffraction light of $n_{23}$-order ($n_{22} \geq n_{23}$) when the third light flux is incident.

According to the invention of item 9, when the diffraction light of the diffraction order lower than the recording/reproducing beam for the high density optical disk is used as the recording/reproducing beam for DVD, and the diffraction light of the diffraction order same as the recording/reproducing beam for DVD, or lower diffraction order is used as the recording/reproducing beam for CD, the high diffraction efficiency can be secured in the wavelength ranges of respective optical disks.

The diffractive optical element written in item 10 is characterized in that: in the invention written in item 9, it satisfies any one of the following expression (14) and expression (15).

$$|INT(\delta\phi_{A13}) - \delta\phi_{A13}| < 0.4 \tag{14}$$

$$|INT(\delta\phi_{B13}) - \delta\phi_{B13}| < 0.4 \tag{15}$$

Where, $$(\delta\phi_{A13}) = \{n_{11} \cdot \lambda_1/(N_{11}-1)\}/\{n_{31} \cdot \lambda_3/(N_{31}1)\} \tag{16}$$

$$(\delta\phi_{B13}) = \{n_{12} \cdot \lambda_1/(N_{12}-1)\}/\{n_{32} \cdot \lambda_3/(N_{32}-1)\} \tag{17}$$

and $N_{11}$, $N_{31}$ are refractive indexes of the first diffractive structure respectively to $\lambda_1$, $\lambda_3$, and $N_{12}$, $N_{32}$ are refractive indexes of the second diffractive structure respectively to $\lambda_1$, $\lambda_3$, and INT(X) is an integer closest to X.

When satisfies any one of expression (14) and expression (15), both of diffraction efficiencies of the first diffractive structure or the second diffractive structure to the third light flux can be heightened. To heighten both of diffraction efficiencies of the first diffractive structure and the second diffractive structure to the third light flux, it is preferable that both of the expression (14) and expression (15) are satisfied.

The diffractive optical element written in item 11 is characterized in that: in the invention written in items 9 or 10, the wavelength $\lambda_1$ is within the range of 350 nm to 450 nm, the wavelength $\lambda_2$ is within the range of 600 nm to 700 nm, and the wavelength $\lambda_3$ is within the range of 750 nm to 850 nm, and when i is 1 or 2, a combination of $n_{1i}$, $n_{2i}$ and $n_{3i}$ is any one of $(n_{1i}, n_{2i}, n_{3i})$=(2, 1, 1), (4, 2, 2), (6, 4, 3), (8, 5, 4), (10, 6, 5), (however, a combination of $n_{11}=n_{12}$ is excluded). When these combinations are selected, the high diffraction efficiency can be maintained in the wavelength ranges of respective optical disks. Further, even when the diffraction order $n_{1i}$, $n_{2i}$, $n_{3i}$ are larger than 10, there is a combination of the diffraction order by which the high diffraction efficiency can be maintained in each of wavelength regions of respective optical disks, however, in that case, because a variation of the diffraction efficiency to the wavelength change of ±about 10 (nm) from the reference wavelength $\lambda_1$ is too large, it is not preferable.

An objective optical system written in item 12 is characterized in that: it is an objective optical system which converges the first light flux of the wavelength $\lambda_1$ (nm) on the information recording surface of the first optical disk having the protective layer of thickness $t_1$, and the second light flux of the wavelength $\lambda_2$ (nm) ($\lambda_2 > \lambda_1$) on the information recording surface of the second optical disk having the protective layer of thickness $t_2$ ($t_2 \geq t_1$), and it has at least each one of the optical surface on which the first diffractive structure which, when the first light flux is incident, generates the diffraction light of $n_{11}$-order, and when the second light flux is incident, generates the diffraction light of $n_{21}$-order ($n_{11} \geq n_{21}$), is formed, and the optical surface on which the second diffractive structure which generates the diffraction light of $n_{12}$-order, when the first light flux is incident, and when the second light flux is incident, which generates the diffraction light of $n_{22}$-order ($n_{12} \geq n_{22}$), is formed, and satisfies the following expression (1).

$$\delta\phi_{A12} \neq \delta\phi_{B12} \tag{1}$$

Where, $\delta\phi_{A12} = \{n_{11} \cdot \lambda_1/(N_{11}-1)\}/\{n_{21} \cdot \lambda_2/(N_{21}-1)\} \tag{2}$ $$\delta\phi_{B12} = \{n_{12} \cdot \lambda_1/(N_{12}-1)\}/\{n_{22} \cdot \lambda_2/(N_{22}-1)\} \tag{3}$$

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$. The effects of the present invention are the same as the invention written in item 1.

An objective optical system written in item 13 is characterized in that: it is an objective optical system which converges the first light flux of the wavelength $\lambda_1$ (nm) on the information recording surface of the first optical disk having the protective layer of thickness $t_1$, and the second light flux of the wavelength $\lambda_2$ (nm) ($\lambda_2 > \lambda_1$) on the information recording surface of the second optical disk having the protective layer of thickness $t_2$ ($t_2 \geq t_1$), and it has at least each one of the optical surface on which the first diffractive structure which, when the first light flux is incident, generates the diffraction light of $n_{21}$-order ($n_{11} > n_{21}$), and when the second light flux is incident, which generates the diffraction light of $n_{21}$-order ($n_{11} \geq n_{21}$), is formed, and the optical surface on which the second diffractive structure which, when the first light flux is incident, generates the diffraction light of $n_{12}$-order and when the second light flux is incident, generates the diffraction light of $n_{22}$-order ($n_{12} \geq n_{22}$), is formed, and satisfies the following expression (4).

$$n_{11} \neq n_{12} \tag{4}$$

The effects of the present invention are the same as the invention written in item 2.

An objective optical system written in item 14 is characterized in that: it is an objective optical system which converges the first light flux of the wavelength $\lambda_1$ (nm) on the information recording surface of the first optical disk having the protective layer of thickness $t_1$, and the second light flux of the wavelength $\lambda_2$ (nm) ($\lambda_2 > \lambda_1$) on the information recording surface of the second optical disk having the protective layer of thickness $t_2$ ($t_2 \geq t_1$), and it has at least each one of the optical surface on which the first diffractive structure which, when the first light flux is incident, generates the diffraction light of $n_{11}$-order and when the second light flux is incident, which generates the diffraction light of $n_{21}$-order ($n_{11} \geq n_{21}$), is formed, and the optical surface on which the second diffractive structure which, when the first light flux is incident, generates the diffraction light of $n_{12}$-order, and when the second light flux is incident, which generates the diffraction light of $n_{22}$-order ($n_{12} \geq n_{22}$), is formed, and satisfies the following expression (5).

$$\{INT(\delta\phi_{A12}) - \delta\phi_{A12}\} \cdot \{INT(\delta\phi_{B12}) - \delta\phi_{B12}\} < 0 \tag{5}$$

Where, $\delta\phi_{A12} = \{n_{11} \cdot \lambda_1/(N_{11}-1)\}/\{n_{21} \cdot \lambda_2/(N_{21}-1)\}$ (2)

$\delta\phi_{B12} = \{n_{12} \cdot \lambda_1/(N_{12}-1)\}/\{n_{22} \cdot \lambda_2/(N_{22}-1)\}$ (3), and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X. The effects of the present invention are the same as the invention written in item 3.

An objective optical system written in item 15 is characterized in that: it is an objective optical system which converges the first light flux of the wavelength $\lambda_1$ (nm) on the information recording surface of the first optical disk having the protective layer of thickness $t_1$, and the second light flux of the wavelength $\lambda_2$ (nm) ($\lambda_2 > \lambda_1$) on the information recording surface of the second optical disk having the protective layer of thickness $t_2$ ($t_2 \geq t_1$), and it has at least each one of the optical surface on which the first diffractive structure which, when the first light flux is incident, generates the diffraction light of $n_{11}$-order, and when the second light flux is incident, which generates the diffraction light of $n_{21}$-order ($n_{11} \geq n_{21}$), is formed, and the optical surface on which the second diffractive structure which, when the first light flux is incident, generates the diffraction light of $n_{12}$-order, and when the second light flux is incident, which generates the diffraction light of $n_{22}$-order ($n_{12} \geq n_{22}$), is formed, and the first diffractive structure has a function to correct the spherical aberration generated due to the difference between the thickness $t_1$ and the thickness $t_2$, and the second diffractive structure has a function to control the spherical aberration generated in the first diffractive structure when the wavelength $\lambda_1$ changes within the range of ±10 nm.

In the invention written in item 15, when the recording and/or reproducing of the information is conducted on the high density optical disk and DVD whose thickness of protective layers are different, by the action of the first diffractive structure, the correction of the spherical aberration due to the difference between the protective layers of the high density optical disk and DVD becomes possible. However, because, in the diffractive structure, the wavelength dependency of the spherical aberration is large, the spherical aberration change to the wavelength change of the incident light flux of ±about 10 nm, becomes large. Because the changing amount of such a spherical aberration is increased in proportion to $NA^4$, in the high density optical disk of 0.1 mm standard using the objective optical system of NA 0.85, the allowance to the oscillation wavelength of the blue violet laser light source becomes severe. When the allowance to the wavelength of the blue violet laser light source becomes severe, further, the wavelength of the blue violet laser light source is changed following the temperature change, the stable recording/reproducing characteristic to the high density optical disk can not be obtained.

Accordingly, in the objective optical system of the present invention, by using the second diffractive structure, the spherical aberration change to the wavelength change of the incident light flux of ±about 10 nm in the blue violet wavelength range is suppressed small. Hereby, an increase of yield in the mass production of the blue violet laser light source, and a reduction of the production cost of the blue violet laser light source or the optical pick-up device becomes possible. Further, even when the temperature is changed, the recording/reproducing of the information for the high density optical disk can also be stably conducted. Hereupon, in the present specification, a phrase "to control the spherical aberration" includes also a case where the spherical aberration is remained due to a predetermined reason, other than a case where the spherical aberration is almost perfectly corrected. Herein, as a case where the spherical aberration is remained due to a predetermined reason, for example, there is a case where the spherical aberration dependency like that the spherical aberration changes to under correction direction, is given to the objective optical system, when the wavelength shifts from the wavelength $\lambda_1$ to the long wavelength side for the purpose to correct the change of the light converging characteristic of the objective optical system following the temperature change.

The objective optical system of item 16 is characterized in that: it is an objective optical system which converges the first light flux of wavelength $\lambda_1$ (nm) on the information recording surface of the first optical disk having a protective layer of thickness $t_1$, and the second light flux of wavelength $\lambda_2$ (nm) ($\lambda_2 > \lambda_1$) on the information recording surface of the second optical disk having a protective layer of thickness $t_2$ ($t_2 = t_1$), and it has at least each one of the optical surface on which the first diffractive structure which, when the first light flux is incident, generates the diffraction light of $n_{11}$-order, and when the second light flux is incident, generates the diffraction light of $n_{21}$-order ($n_{11} \geq n_{21}$), is formed, and the optical surface on which the second diffractive structure which, when the first light flux is incident, generates the diffraction light of $n_{12}$-order and when the second light flux is incident, generates the diffraction light of $n_{22}$-order ($n_{12} \geq n_{22}$), is formed, and the first diffractive structure has a function to correct the spherical aberration generated due to the wavelength dispersion by the wavelength difference between the wavelength $\lambda_1$ and the wavelength $\lambda_2$, and the second diffractive structure has a function to control the spherical aberration generated in the first diffractive structure when the wavelength $\lambda_1$ changes within the range of ±10 nm.

As a standard of the high density optical disk, other than 0.1 mm standard, a standard in which the objective optical system of numerical aperture (NA) 0.65 and a protective layer of 0.6 mm which is the same as DVD (hereinafter, called 0.6 mm standard) are used, is proposed. In the 0.6 mm standard, it is not necessary to correct the spherical aberration due to the difference of the thickness of protective layer from that of DVD, however, it is necessary to correct the spherical aberration generated due to the wavelength dispersion by the wavelength difference between the blue violet wavelength and the red wavelength. In the invention written in item 16, by the action of the first diffractive structure, the spherical aberration generated due to the wavelength dispersion by the wavelength difference between the blue violet wavelength and the red wavelength can be corrected. However, also in this case, the spherical aberration change generated in the first diffractive structure to the wavelength change of the incident light flux of ±about 10 nm in the blue violet wavelength range becomes large.

Accordingly, in the objective optical system of the present invention, it is structured in such a manner that, by using the second diffractive structure, the spherical aberration change to the wavelength change of the incident light flux of ±about 10 nm in the blue violet wavelength range is suppressed small. Hereby, an increase of the yield in the mass production of the blue violet laser light source, and a reduction of the production cost of the blue violet laser light source or optical pick-up device become possible. Further, even when the temperature is changed, the recording/reproducing of the information can also be stably conducted for the high density optical disk.

Because the objective optical system written in item 17 is characterized in that, in the invention written in any one of items 12 to 16, the second diffractive structure has a function to suppress the spherical aberration generated in the first diffractive structure when the wavelength $\lambda_1$ is changed within the range of ±10 nm, small, the allowance to the oscillation wavelength of the blue violet laser light source can be softened.

Because the objective optical system written in item 18 is characterized in that, in the invention written in any one of items 12 to 16, the objective optical system has the spherical aberration characteristic by which the spherical aberration changes to the under correction direction when the wavelength $\lambda_1$ is changed to the long wavelength side within the range of +10 nm, the change of light converging characteristic of the objective optical system generated due to the temperature change can be compensated.

Because the objective optical system written in item 19 is characterized in that: in the invention written in item 18, it has at least one plastic lens, this is a low cost, however, a disadvantages of the plastic material which generates the refraction index change due to the temperature change can be compensated by using the function of the second diffractive structure.

The objective optical system written in item 20 is characterized in that: in the invention written in any one of items 12 to 19, it satisfies either one of the following expression (6) or expression (7).

$$|INT(\delta\phi_{A12}) - \delta\phi_{A12}| < 0.4 \quad (6)$$

$$|INT(\delta\phi_{B12}) - \delta\phi_{B12}| < 0.4 \quad (7)$$

Where, $$(\delta\phi_{A12}) = \{n_{11} \cdot \lambda_1/(N_{11}-1)\}/\{n_{21} \cdot \lambda_2/(N_{21}-1)\} \quad (2)$$

$$(\delta\phi_{B12}) = \{n_{12} \cdot \lambda_1/(N_{12}-1)\}/\{n_{22} \cdot \lambda_2/(N_{22}-1)\} \quad (3)$$

and $N_{11}$, $N_{21}$ are refractive indexes of the first diffractive structure respectively to $\lambda_1$, $\lambda_2$, and $N_{12}$, $N_{32}$ are refractive indexes of the second diffractive structure respectively to $\lambda_1$, $\lambda_2$, and INT(X) is an integer closest to X. The effects of the present invention are the same as the invention written in item 4.

The objective optical system written in item 21 is characterized in that: both of the first diffractive structure and the second diffractive structure are composed of a plurality of concentric circular ring shaped zones divided by the step difference in the optical axis direction, and the depth $d_1$ of the step difference closest to the optical axis in the ring shaped zones of the first diffractive structure and the depth $d_2$ of the step difference closest to the optical axis in the ring shaped zones of the second diffractive structure satisfy the following expression (8).

$$d_1 \neq d_2 \quad (8)$$

Effects of the present invention are the same as the invention written in item 5.

The objective optical system written in item 22 is characterized in that: in the invention written in any one of items 12 to 21, it satisfies the following expression (9) and expression (10).

$$|INT(\delta\phi_{A12}) - \delta\phi_{A12}| > 0.07 \quad (9)$$

$$|INT(\delta\phi_{B12}) - \delta\phi_{B12}| < 0.07 \quad (10)$$

Where, $$\delta\phi_{A12} = \{n_{11} \cdot \lambda_1/(N_{11}-1)\}/\{n_{21} \cdot \lambda_2/(N_{21}-1)\} \quad (2)$$

$$\delta\phi_{B12} = \{n_{12} \cdot \lambda_1/(N_{12}-1)\}/\{n_{22} \cdot \lambda_2/(N_{22}-1)\} \quad (3),$$

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X. The effects of the present invention are the same as the invention written in item 6.

The objective optical system written in item 23 is characterized in that: in the invention written in any one of items 12 to 22, it satisfies the following expressions (11) to (13).

$$\lambda_2/\lambda_1 > 1.3 \quad (11)$$

$$n_{11} > n_{21} \quad (12)$$

$$n_{12} > n_{22} \quad (13)$$

Effects of the present invention are the same as the invention written in item 7.

The objective optical system written in item 24 is characterized in that: in the invention written in any one of items 12 to 23, the wavelength $\lambda_1$ is within the range of 350 nm to 450 nm, and the wavelength $\lambda2$ is within the range of 600 nm to 700 nm, and when i is 1 or 2, a combination of $n_{1i}$, and $n_{2i}$ is any one of $(n_{1i}, n_{2i})$=(1, 1), (2, 1), (3, 2), (4, 2), (5, 3), (6, 4), (7, 4), (8, 5), (9, 6), (10, 6), (however, a combination of $n_{11}$=$n_{12}$ is excluded). Effects of the present invention are the same as the invention written in item 8.

The objective optical system written in item 25 is characterized in that: in the invention written in any one of items 12 to 23, the first diffractive structure generates the diffraction light of $n_{13}$-order ($n_{12} \geq n_{13}$) when the third light flux of the wavelength $\lambda_3$ (nm) ($\lambda_3 > \lambda_2$) is incident, and the second diffractive structure generates the diffraction light of $n_{23}$-order ($n_{22} \geq n_{23}$) when the third light flux is incident. Effects of the present invention are the same as the invention written in item 9.

The objective optical system written in item 26 is characterized in that: in the invention written in item 25, it satisfies any one of the following expression (14) and expression (15).

$$|INT(\delta\phi_{A13}) - \delta\phi_{A13}| < 0.4 \quad (14)$$

$$|INT(\delta\phi_{B13}) - \delta\phi_{B13}| < 0.4 \quad (15)$$

Where, $$\delta\phi_{A13} = \{n_{11} \cdot \lambda_1/(N_{11}-1)\}/\{n_{31} \cdot \lambda_3/(N_{31}-1)\} \quad (16)$$

$$\delta\phi_{B13} = \{n_{12} \cdot \lambda_1/(N_{12}-1)\}/\{n_{32} \cdot \lambda_3/(N_{32}-1)\} \quad (17),$$

and $N_{11}$, $N_{31}$ are refractive indexes of the first diffractive structure respectively to $\lambda_1$, $\lambda_3$, and $N_{12}$, $N_{32}$ are refractive indexes of the second diffractive structure respectively to $\lambda_1$, $\lambda_3$, and INT(X) is an integer closest to X. The effects of the present invention are the same as the invention written in item 10.

The objective optical system written in item 27 is characterized in that: in the invention written in item 25 or 26, the wavelength $\lambda_1$ is within the range of 350 nm to 450 nm, the wavelength $\lambda_2$ is within the range of 600 nm to 700 nm, and the wavelength $\lambda_3$ is within the range of 750 nm to 850 nm, and when i is 1 or 2, a combination of $n_{1i}$, $n_{2i}$ and $n_{3i}$ is any one of $(n_{1i}, n_{2i}, n_{3i})$=(2, 1, 1), (4, 2, 2), (6, 4, 3), (8, 5, 4), (10, 6, 5), (however, a combination of $n_{11}$=$n_{12}$ is excluded). The effects of the present invention are the same as the invention written in item 11.

The objective optical system written in item 28 is characterized in that: it is composed of the diffractive optical element having the optical surface on which the first diffractive structure is formed, and the optical surface on which the second diffractive structure is formed, and the light converging element which converges the first light flux and the second light flux which transmit the diffractive optical element, respectively on the information recording surfaces of the first optical disk and second optical disk, and the diffractive optical element and the light converging element are integrated.

An optical pick-up device written in item 29 is an optical pick-up device which is characterized in that: in the optical pick-up device having the first light source which projects the first light flux of the wavelength $\lambda_1$ (nm), the second light source which projects the second light flux of the wavelength $\lambda_2$ (nm) ($\lambda_2 > \lambda_1$), and the objective optical system by which the recording and/or reproducing of the information is conducted, by light converging the first light flux on the information recording surface of the first optical disk having the protective layer of the thickness $t_1$, and the recording and/or reproducing of the information is conducted, by light converging the first light flux on the information recording surface of the second optical disk having the protective layer of the thickness $t_2$ ($t_2 > t_1$), the objective optical system has at least each one of the optical surface on which the first diffractive structure which generates the diffraction light of $n_{11}$-order when the first light flux is incident, and when the second light flux is incident, which generates the diffraction light of $n_{21}$-order ($n_{11} \geq n_{21}$), is formed, and the optical surface on which the second diffractive structure which generates the diffraction light of $n_{12}$-order when the first light flux is incident, and generates the diffraction light of $n_{22}$-order ($n_{12} \geq n_{22}$) when the second light flux is incident, is formed, and satisfies the following expression (1).

$$\delta\phi_{A12} \neq \delta\phi_{B12} \quad (1)$$

Where, $$\delta\phi_{A12} = \{n_{11} \cdot \lambda_1/(N_{11}-1)\}/\{n_{21} \cdot \lambda_2/(N_{21}-1)\} \quad (2)$$

$$\delta\phi_{B12} = \{n_{12} \cdot \lambda_1/(N_{12}-1)\}/\{n_{22} \cdot \lambda_2/(N_{22}-1)\} \quad (3)$$

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$. The effects of the present invention are the same as the invention written in item 1.

The optical pick-up device written in item 30 is characterized in that: in the optical pick-up device having the first light source which projects the first light flux of the wavelength $\lambda_1$ (nm), the second light source which projects the second light flux of the wavelength $\lambda_2$ (nm) ($\lambda_2 > \lambda_1$), and the objective optical system by which the recording and/or reproducing of the information is conducted by light-converging the first light flux on the information recording surface of the first optical disk having the protective layer of thickness $t_1$ and the recording and/or reproducing of the information is conducted by light-converging the second light flux on the information recording surface of the second optical disk having the protective layer of thickness $t_2$ ($t_2 > t_1$), the objective optical system has at least each one of the optical surface on which the first diffractive structure which generates the diffraction light of $n_{11}$-order when the first light flux is incident, and which generates the diffraction light of $n_{21}$-order ($n_{11} \geq n_{21}$) when the second light flux is incident, is formed, and the optical surface on which the second diffractive structure which generates the diffraction light of $n_{12}$-order when the first light flux is incident, and which generates the diffraction light of $n_{22}$-order ($n_{12} \geq n_{22}$) when the second light flux is incident, is formed, and satisfies the following expression (4).

$$n_{11} \neq n_{12} \quad (4)$$

The effects of the present invention are the same as the invention written in item 2.

The optical pick-up device written in item 31 is characterized in that: it has at least each one of the optical surface on which the first diffractive structure which generates the diffraction light of $n_{11}$-order when the first light flux of wavelength $\lambda_1$ (nm) is incident, and which generates the diffraction light of $n_{21}$-order ($n_{11} \geq n_{21}$) when the second light flux of wavelength $\lambda_2$ (nm) ($\lambda_2 > \lambda_1$) is incident, is formed, and the optical surface on which the second diffractive structure which generates the diffraction light of $n_{12}$-order when the first light flux of wavelength $\lambda_1$ (nm) is incident, and which generates the diffraction light of $n_{22}$-order ($n_{12} \geq n_{22}$) when the second light flux of wavelength $\lambda_2$ (nm) ($\lambda_2 > \lambda_1$) is incident, is formed, and satisfies the following expression (5).

$$\{INT(\delta\phi_{A12}) - \delta\phi_{A12}\} \cdot \{INT(\delta\phi_{B12}) - \delta\phi_{B12}\} < 0 \quad (5)$$

Where, $\delta\phi_{A12} = \{n_{11} \cdot \lambda_1/(N_{11}-1)\}/\{n_{21} \cdot \lambda_2/(N_{21}-1)\}$ (2)

$\delta\phi_{B12} = \{n_{12} \cdot \lambda_1/(N_{12}-1)\}/\{n_{22} \cdot \lambda_2/(N_{22}-1)\}$ (3), and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X. The effects of the present invention are the same as the invention written in item 3.

The optical pick-up device written in item 32 is characterized in that: in the optical pick-up device having the first light source projecting the first light flux of the wavelength $\lambda_1$ (nm), the second light source projecting the second light flux of the wavelength $\lambda_2$ (nm) ($\lambda_2 > \lambda_1$), and the objective optical system by which the recording and/or reproducing of the information is conducted by light-converging the first light flux on the information recording surface of the first optical disk having the protective layer of thickness $t_1$, and the recording and/or reproducing of the information is conducted by light-converging the second light flux on the information recording surface of the second optical disk having the protective layer of thickness $t_2$ ($t_2 > t_1$), and the objective optical system has at least each one of the optical surface on which the first diffractive structure which, when the first light flux is incident, generates the diffraction light of $n_{11}$-order, and when the second light flux is incident, which generates the diffraction light of $n_{21}$-order ($n_{11} > n_{21}$), is formed, and the optical surface on which the second diffractive structure which, when the first light flux is incident, generates the diffraction light of $n_{12}$-order, and when the second light flux is incident, which generates the diffraction light of $n_{22}$-order ($n_{12} > n_{22}$), is formed, and the first diffractive structure has a function to correct the spherical aberration generated due to the difference between the thickness $t_1$ and the thickness $t_2$, and the second diffractive structure has a function to control the spherical aberration generated in the first diffractive structure when the wavelength $\lambda_1$ changes within the range of ±10 nm. The effects of the present invention are the same as the invention written in item 15.

The optical pick-up device written in item 33 is characterized in that: in the optical pick-up device having the first light source projecting the first light flux of the wavelength $\lambda_1$ (nm), the second light source projecting the second light flux of the wavelength $\lambda_2$ (nm) ($\lambda_2 > \lambda_1$), and the objective optical system by which the recording and/or reproducing of the information is conducted by light-converging the first light flux on the information recording surface of the first optical disk having the protective layer of thickness $t_1$, and the recording and/or reproducing of the information is conducted by light-converging the second light flux on the information recording surface of the second optical disk having the protective layer of thickness $t_2$ ($t_2 > t_1$), the objective optical system has at least each one of the optical surface on which the first diffractive structure which, when the first light flux is incident, generates the diffraction light of $n_{11}$-order, and when the second light flux is incident, which generates the diffraction light of $n_{21}$-order ($n_{11} > n_{21}$), is formed, and the optical surface on which the second diffractive structure which, when the first light flux is incident, generates the diffraction light of $n_{12}$-order, and when the second light flux is incident, which generates the diffraction light of $n_{22}$-order ($n_{12} > n_{22}$), is formed, and the first diffractive structure has a function to correct the spherical aberration generated due to the wavelength dispersion by the wavelength difference between $\lambda_1$ and $\lambda_2$, and the second diffractive structure has a function to control the spherical aberration generated in the first diffractive structure when the wavelength $\lambda_1$ changes within the range of ±10 nm. The effects of the present invention are the same as the invention written in item 16.

The optical pick-up device written in item 34 is characterized in that: in the invention written in any one of items 29 to 33, the second diffractive structure has a function to suppress the spherical aberration generated in the first diffractive structure when the wavelength $\lambda_1$ changes within the range of ±10 nm, small. The effects of the present invention are the same as the invention written in item 17.

The optical pick-up device written in item 35 is characterized in that: in the invention written in any one of items 29 to 33, the objective optical system has a spherical aberration characteristic in which the spherical aberration changes to under correction direction when the wavelength $\lambda_1$ changes to long wavelength side within the range of +10 nm. The effects of the present invention are the same as the invention written in item 18.

The optical pick-up device written in item 36 is characterized in that: in the invention written in item 35, it has at least one plastic lens. The effects of the present invention are the same as the invention written in item 19.

The optical pick-up device written in item 37 is characterized in that: in the invention written in any one of items 29 to 36, it satisfies any one of the following expression (6) and expression (7).

$$|INT(\delta\phi_{A12}) - \delta\phi_{A12}| < 0.4 \quad (6)$$

$$|INT(\delta\phi_{B12}) - \delta\phi_{B12}| < 0.4 \quad (7)$$

Where, $(\delta\phi_{A12}) = \{n_{11} \cdot \lambda_1/(N_{11}-1)\}/\{n_{21} \cdot \lambda_2/(N_{21}-1)\}$ (2)

$(\delta\phi_{B12}) = \{n_{12} \cdot \lambda_1/(N_{12}-1)\}/\{n_{22} \cdot \lambda_2/(N_{22}-1)\}$ (3), and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X. The effects of the present invention are the same as the invention written in item 4.

The optical pick-up device written in item 38 is characterized in that: in the invention written in any one of items 29 to 37, both of the first diffractive structure and the second diffractive structure are composed of a plurality of concentric circular ring shaped zones divided by the step difference in the optical axis direction, and the depth $d_1$ of the step difference closest to the optical axis in the ring shaped zones of the first diffractive structure and the depth $d_2$ of the step difference closest to the optical axis in the ring shaped zones of the second diffractive structure satisfy the following expression (7).

$$d_1 \neq d_2 \quad (8)$$

The effects of the present invention are the same as the invention written in item 5.

The optical pick-up device written in item 39 is characterized in that: in the invention written in any one of items 29 to 38, it satisfies the following expression (9) and expression (10).

$$|INT(\delta\phi_{A12}) - \delta\phi_{A12}| > 0.07 \quad (9)$$

$$|INT(\delta\phi_{B12}) - \delta\phi_{B12}| < 0.07 \quad (10)$$

Where, $$\delta\phi_{A12} = \{n_{11} \cdot \lambda_1/(N_{11}-1)\}/\{n_{21} \cdot \lambda_2/(N_{21}-1)\} \quad (2)$$

$$\delta\phi_{B12} = \{n_{12} \cdot \lambda_1/(N_{12}-1)\}/\{n_{22} \cdot \lambda_2/(N_{22}-1)\} \quad (3),$$

and $N_{11}$, $N_{21}$ are refractive indexes of the first diffractive structure respectively to $\lambda_1$, $\lambda_2$, and $N_{12}$, $N_{22}$ are refractive indexes of the second diffractive structure respectively to $\lambda_1$, $\lambda_2$, and INT(X) is an integer closest to X. The effects of the present invention are the same as the invention written in item 6.

The optical pick-up device written in item 40 is characterized in that: in the invention written in any one of items 29 to 39, it satisfies the following, expressions (11) to (13).

$$\lambda_2/\lambda_1 > 1.3 \quad (11)$$

$$n_{11} > n_{21} \quad (12)$$

$$n_{12} > n_{22} \quad (13)$$

The effects of the present invention are the same as the invention written in item 7.

The optical pick-up device written in item 41 is characterized in that: in the invention written in any one of items 29 to 40, the wavelength $\lambda_1$ is within the range of 350 nm to 450 nm, and the wavelength $\lambda_2$ is within the range of 600 nm to 700 nm, and when i is 1 or 2, a combination of $n_{1i}$, and $n_{2i}$ is any one of $(n_{1i}, n_{2i})$=(1, 1), (2, 1), (3, 2), (4, 2), (5, 3), (6, 4), (7, 4), (8, 5), (9, 6), (10, 6), (however, a combination of $n_{11}=n_{12}$ is excluded). The effects of the present invention are the same as the invention written in item 8.

The optical pick-up device written in item 42 is characterized in that: in the invention written in any one of items 29 to 41, the first diffractive structure generates the diffraction light of $n_{13}$-order ($n_{12} \geq n_{13}$) when the third light flux of the wavelength $\lambda_3$ (nm) ($\lambda_3 > \lambda_2$) is incident, and the second diffractive structure generates the diffraction light of $n_{23}$-order ($n_{22} \geq n_{23}$) when the third light flux is incident. The effects of the present invention are the same as the invention written in item 9.

The optical pick-up device written in item 43 is characterized in that: in the invention written in item 42, it satisfies any one of the following expression (14) and expression (15).

$$|INT(\delta\phi_{A13}) - \delta\phi_{A13}| < 0.4 \quad (14)$$

$$|INT(\delta\phi_{B13}) - \delta\phi_{B13}| < 0.4 \quad (15)$$

Where, $$(\delta\phi_{A13}) = \{n_{11} \cdot \lambda_1/(N_{11}-1)\}/\{n_{31} \cdot \lambda_3/(N_{31}-1)\} \quad (16)$$

$$(\delta\phi_{B13}) = \{n_{12} \cdot \lambda_1/(N_{12}-1)\}/\{n_{32} \cdot \lambda_3/(N_{32}-1)\} \quad (17),$$

and $N_{11}$, $N_{31}$ are refractive indexes of the first diffractive structure respectively to $\lambda_1$, $\lambda_3$, and $N_{12}$, $N_{32}$ are refractive indexes of the second diffractive structure respectively to $\lambda_1$, $\lambda_3$, and INT(X) is an integer closest to X. The effects of the present invention are the same as the invention written in item 10.

The optical pick-up device written in item 44 is characterized in that: in the invention written in item 42 or 43, the wavelength $\lambda_1$ is within the range of 350 nm to 450 nm, the wavelength $\lambda_2$ is within the range of 600 nm to 700 nm, and the wavelength $\lambda_3$ is within the range of 750 nm to 850 nm, and when i is 1 or 2, a combination of $n_{1i}$, $n_{2i}$ and $n_{3i}$ is any one of $(n_{1i}, n_{2i}, n_{3i})$=(2, 1, 1), (4, 2, 2), (6, 4, 3), (8, 5, 4), (10, 6, 5), (however, a combination of $n_{11}=n_{12}$ is excluded). The effects of the present invention are the same as the invention written in item 11.

The optical pick-up device written in item 45 is characterized in that: in the invention written in any one of items 29 to 44, it is composed of the diffractive optical element having the optical surface on which the first diffractive structure is formed, and the optical surface on which the second diffractive structure is formed, and the light converging element which converges the first light flux and the second light flux which transmit the diffractive optical element, respectively on the information recording surfaces of the first optical disk and second optical disk, and the diffractive optical element and the light converging element are integrated.

An optical information recording reproducing apparatus written in item 46 is characterized in that: the optical pick-up device written in any one of items 29 to 45 is mounted, and at least any one of the recording of the information for the first optical disk and the second optical disk and the reproducing of the information recorded in the first optical disk and the second optical disk, can be conducted.

The "diffractive structure" used in the present specification means a portion to which the diffraction pattern is provided on the surface of the optical element, and to which a function by which, by the diffraction action, the incident light flux is converged or diverged, is given. The shape of the diffraction pattern is a plurality of concentric circular ring shaped zones divided by the step difference in the optical axis, and when its cross section is viewed on the plane including the optical axis, each ring shaped zone has the saw-toothed shape or the step shape.

In the present specification, the high density optical disk or the first optical disk is referred to the optical disk of 0.1 mm standard represented by a BD (Blue-ray Disk) or an optical disk using the blue violet laser light source such as an optical disk of 0.6 mm standard represented by HD, DVD. Further, in the high density optical disk or the first optical disk, an optical disk having the protective layer of the thickness of about several—several tens nm on the information recording surface, or an optical disk whose protective layer or thickness of the protective layer is 0, or photo-magnetic disk is also included. Further, the second optical disk includes an optical disk of each kind of DVD series such as DVD-ROM, DVD-Video, DVD-Audio, DVD±R, DVD-RAM, DVD±RW. Further, the third optical disk includes an optical disk of each kind of CD series such as CD-Audio, CD-ROM, CD-R, CD-RW.

DETAILED DESCRIPTION OF THE INVENTION

Referring to the drawings, embodiments of the present invention will be described below.

The First Embodiment

FIG. 1 is a view generally showing the structure of the first optical pick-up device PU1 by which the recording/reproducing of the information can be adequately conducted on the high density optical disk HD (the first optical disk) and DVD (the second optical disk). The optical specification of the high density optical disk HD is wavelength $\lambda_1=405$ nm, the thickness $t_1$ of the protective layer PL1=0.1 mm, numerical aperture $NA_1=0.85$, and the optical specification of DVD is wavelength $\lambda_2=655$ nm, the thickness $t_2$ of the protective layer PL2=0.6 mm, numerical aperture $NA_2=0.65$. However, a combination of the wavelength, thickness of the protective layer, and numerical aperture is not limited to this.

As shown in FIG. 1, the optical pick-up device PU1 is composed of the blue violet semiconductor laser LD1 projecting the first light flux, the red semiconductor laser LD2 projecting the second light flux, a photo-detector-PD commonly used for the high density optical disk HD and DVD, a beam shaping element BSH for shaping the sectional shape of the laser light flux projected from the blue violet semiconductor laser LD1 from an oval to a circle, the first collimator optical system COL1, the second collimator optical system COL2, a 2-axis actuator, the first objective optical system OBJ1, the first beam combiner BC1, the second beam combiner BC2, a stop corresponding to the numerical aperture NA1 of the high density optical disk HD, a dichroic filter DF, a sensor optical system SEN.

Hereupon, as the light source for the high density optical disk HD, other than the blue violet semiconductor laser LD1, a blue violet SHG laser can also be used.

In the optical pick-up PU1, when the recording/reproducing of the information is conducted on the high density optical disk HD, as its light ray path is drawn by the solid line in FIG. 1, the diverging light flux projected from the blue violet semiconductor laser LD1 is, after its sectional shape is shaped from ellipse to circle by the beam shaping element BSH, made almost parallel light flux via the first collimator optical system COL1, and it transmits the first beam combiner BC1, second beam combiner BC2, the diameter of light flux is regulated by the stop ST, and becomes a spot formed on the information recording surface RL1 through the protective layer PL1 of the high density optical disk. HD by the first objective optical system OBJ1. The first objective optical system OBJ1 conducts focusing and tracking by the 2-axis actuator AC arranged at its periphery. The reflected light flux modulated by an information pit on the information recording surface RL1, after transmits again the first objective optical system OBJ1, and the stop ST, is reflected by the second beam combiner BC2, and becomes the converging light flux by passing through the sensor optical system SEN, the astigmatism is given to it, and it converges on the light receiving surface of the photo-detector PD. Then, by using the output signal of the photo-detector PD, the information recorded in the high density optical disk HD can be read.

Further, in the optical pick-up device PU1, when the recording/reproducing of the information is conducted on DVD, as its light ray path is drawn by a dotted line in FIG. 1, the diverging light flux projected from the red semiconductor laser LD2 is made almost parallel light flux via the second collimator optical system COL2, after reflected by the first beam combiner BC1, it transmits the second beam combiner BC2, and the diameter of light flux is regulated by the dichroic filter DF, and it becomes a spot formed on the information recording surface RL2 through the protective layer PL2 of DVD by the first objective optical system OBJ1. The first objective optical system OBJ1 conducts focusing and tracking by the 2-axis actuator AC arranged at its periphery. The reflected light flux modulated by an information pit on the information recording surface RL2, after transmits again the first objective optical system OBJ1, the dichroic filter DF and the stop ST, is reflected by the second beam combiner BC2, and becomes the converging light flux by passing through the sensor optical system SEN, and the astigmatism is given to it, and it converges on the light receiving surface of the photo-detector PD. Then, by using the output signal of the photo-detector PD, the information recorded in DVD can be read.

Next, a structure of the first objective optical system OBJ1 will be described. The first objective optical system OBJ1 is structured by an aberration correction element L1 which is a plastic lens, and light converging element L2 which is an aspheric surface glass lens of NA 0.85 having a function to light converges the laser light flux transmitted this aberration correction element L1 on the information recording surface of the optical disk. On the optical surface S1 of the laser light source side of the aberration correction element L1, the blaze type first diffractive structure DOE1 composed of a plurality of ring shaped zones whose sectional shape including the optical axis is saw-toothed shape is formed. Further, on the optical surface S2 of the optical disk side of the aberration correction element L1, the second diffractive structure DOE2 composed of a plurality of blaze type ring shaped zones composed of a plurality of ring shaped zones whose sectional shape including the optical axis is saw-toothed shape is formed. Further, the dichroic filter DF, aberration correction element L1 and light converging element L2 are integrated through the holding member B.

The first diffractive structure DOE1 is a structure to correct the spherical aberration due to the difference between the thickness $t_1$ of the protective layer PL1 of the high density optical disk HD and the thickness $t_2$ of the protective layer PL2 of DVD, and to finely correct such a spherical aberration, the first diffractive-structure DOE1 is formed on the aspheric surface. Further, as the diffraction order $n_{11}$ of a beam for the recording/reproducing of the high density optical disk HD, and the diffraction order $n_{21}$ of a beam for the recording/reproducing of DVD, when $n_{11}=2$, $n_{21}=1$ are respectively selected, the high diffraction efficiency is secured in the wavelength ranges of both optical disks.

Figure 2:
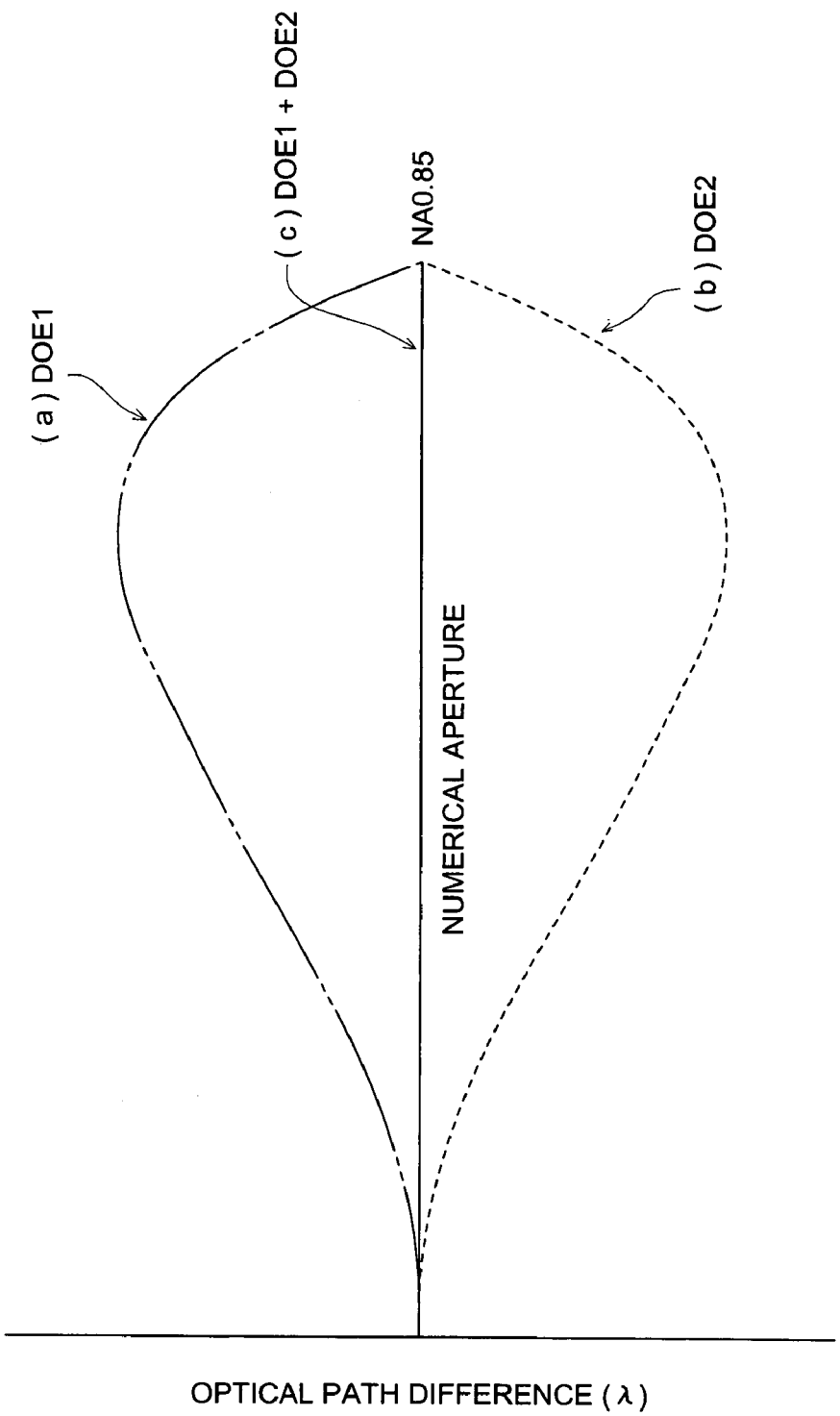
FIG. 2 is a view showing the relationship between a numerical aperture NA and optical path difference.

In the first diffractive structure DOE1, because the ratio $\delta\phi_{A12}$ of the light path length of the first light flux and the second light flux expressed by the above expression (2) satisfies $$INT(\delta\phi_{A12})-\delta\phi_{A12}<0, \tag{19}$$

as shown by a two-dotted chain line (a) in FIG. 2, when the wavelength of the light flux incident on the first diffractive structure shifts from the designed wavelength $\lambda_1$ of the high density optical disk side to the long wavelength side by $\Delta\lambda$, it has the spherical aberration characteristic by which spherical aberration changes to the over correction direction.

To correct such a wavelength dependency of the spherical aberration of the first diffractive structure, in the second diffractive structure DOE2, because, as the diffraction order $n_{12}$ of the beam for recording/reproducing of the high density optical disk HD, and the diffraction order $n_{22}$ of the beam for recording/reproducing of DVD, $n_{12}=3$, $n_{22}=2$ are respectively selected so that the ratio $\delta\phi_{B12}$ of the light path length of the first light flux and the second light flux expressed by the above expression (3) satisfies INT($\delta\phi_{B12}$)−$\delta\phi_{B12}$>0, (20), as shown in a dotted line (b) of FIG. 2, the second diffractive structure has the spherical aberration characteristic by which the spherical aberration changes to the under correction direction by the shift to the long wavelength side of the incident light flux.

As described above, in the first diffractive structure DOE1 which generates the beam of the diffraction order respectively different to 2 wavelengths whose wavelength difference is large, and which has a value in which a ratio of the optical path length $\delta\phi A12$ of the first light flux and the second light flux is a value close to 1, a changing amount of the spherical aberration per unit wavelength change is large, however, when the reverse spherical aberration characteristic to the first diffractive structure is given to the second diffractive structure, as the solid line (c) in FIG. 2, the wavelength dependency of the spherical aberration can be cancelled out.

The Second Embodiment

Next, the second embodiment of the present invention will be described, however, the same sign is given to the same structure as the first embodiment, and the explanation will be omitted.

Figure 3:
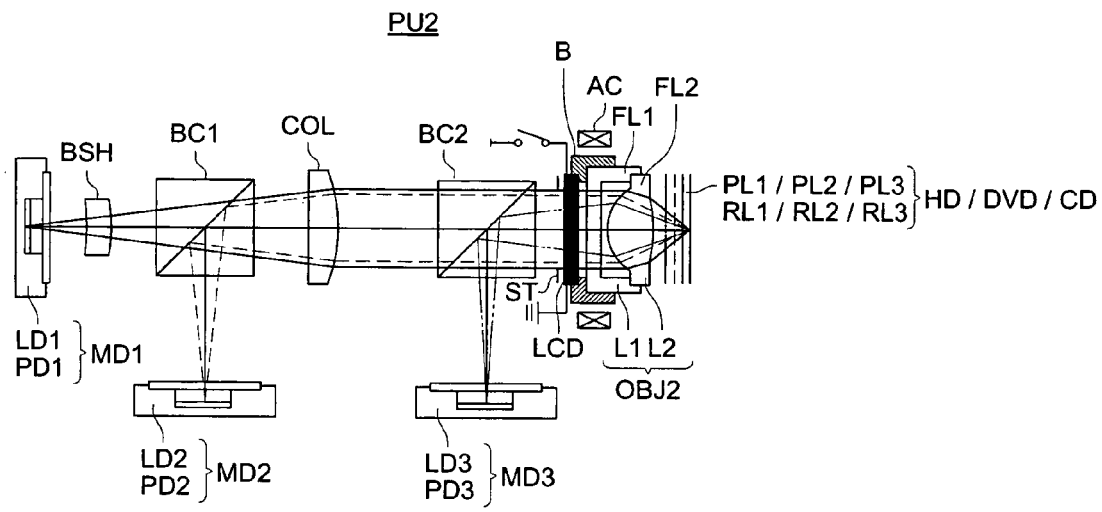
FIG. 3 is an outline structural view of the second optical pick-up device PU2 according to the present embodiment.

FIG. 3 is a view generally showing the structure of the second optical pick-up device PU2 by which the recording/reproducing of the information can be adequately conducted on the high density optical disk HD (the first disk), DVD (the second disk) and CD (the third optical disk). The optical specification of the high density optical disk HD is wavelength $\lambda_1=405$ nm, the thickness $t_1$ of the protective layer PL1=0.1 mm, numerical aperture $NA_1=0.85$, the optical specification of DVD is wavelength $\lambda_2=655$ nm, the thickness $t_2$ of the protective layer PL2=0.6 mm, numerical aperture $NA_2=0.65$, and the optical specification of CD is wavelength $\lambda_3=785$ nm, the thickness $t_3$ of the protective layer PL3=1.2 mm, numerical aperture $NA_3=0.45$.

However, a combination of the wavelength, thickness of the protective layer, and numerical aperture is not limited to this.

The optical pick-up device PU2 is composed of a module MD1 for the high density optical disk in which the blue violet semiconductor laser LD1 projecting the first light flux and the photo detector PD1 are integrated, a module MD2 for DVD in which the red semiconductor laser LD2 projecting the second light flux and the photo detector PD2 are integrated, a module MD3 for CD in which the infrared semiconductor laser LD3 projecting the third light flux and the photo detector PD3 are integrated, a beam shaping element BSH for shaping the sectional shape of the laser light flux projected from the blue violet semiconductor laser LD1 from an oval to a circle, the collimator optical system COL, a 2-axis actuator AC, the second objective optical system OBJ2, the first beam combiner BC1, the second beam combiner BC2, a stop ST corresponding to the numerical aperture NA1 of the high density optical disk HD, and liquid crystal element LCD. Hereupon, as the light source for the high density optical disk HD, other than the blue violet semiconductor laser LD1, a blue violet SHG laser can also be used.

In the optical pick-up PU2, when the recording/reproducing of the information is conducted on the high density optical disk HD, as its light ray path is drawn by the solid line in FIG. 3, the blue violet semiconductor laser LD1 is light emitted. The divergent light flux projected from the blue violet semiconductor laser LD1, after its sectional shape is shaped from ellipse to circle by the beam shaping element BSH, transmits the first beam combiner BC1, and is made almost parallel light flux via the collimator optical system COL, and it transmits the second beam combiner BC2, the diameter of light flux is regulated by the stop ST, and it transmits the liquid crystal element LCD, and becomes a spot formed on the information recording surface RL1 through the protective layer PL1 of the high density optical disk HD by the second objective optical system OBJ2. The second objective optical system OBJ2 conducts focusing and tracking by the 2-axis actuator AC arranged at its periphery. The reflected light flux modulated by an information pit on the information recording surface RL1, after transmits again the first objective optical system OBJ1, the liquid crystal element LCD, the stop ST, the second beam combiner BC2, and the collimator optical system COL, becomes the converging light flux, and it transmits the first beam combiner BC1, and converges on the light receiving surface of the photo-detector PD1. Then, by using the output signal of the photo-detector PD1, the information recorded in the high density optical disk HD can be read.

Further, in the optical pick-up device PU2, when the recording/reproducing of the information is conducted on DVD, as its light ray path is drawn by a dotted line in FIG. 3, the red semiconductor laser LD2 is light emitted. The diverging light flux projected from the red semiconductor laser LD2 is reflected by the first beam combiner BC1, and made almost parallel light flux via the collimator optical system COL, and after it transmits the second beam combiner BC2, the diameter of light flux is regulated by the liquid crystal element LCD, and it becomes a spot-formed on the information recording surface RL2 through the protective layer PL2 of DVD by the second objective optical system OBJ2. The second objective optical system OBJ2 conducts focusing and tracking by the 2-axis actuator AC arranged at its periphery. The reflected light flux modulated by an information pit on the information recording surface RL2, after transmits again the second objective optical system OBJ2, the liquid crystal element LCD, the second beam combiner BS1, and the collimator optical system COL, becomes the converging light flux, and reflected by the first beam combiner BC1, and converges on the light receiving surface of the photo-detector PD2. Then, by using the output signal of the photo-detector PD2, the information recorded in DVD can be read.

Further, in the optical pick-up device PU2, when the recording/reproducing of the information is conducted on CD, as its light ray path is drawn by a two-dotted chain line in FIG. 3, the infrared semiconductor laser LD3 is light emitted. The divergent light flux projected from the infrared semiconductor laser LD3, after reflected by the second beam combiner BC2, the diameter of the light flux is regulated by the liquid crystal element LCD, becomes a spot formed on the information recording surface RL3 through the protective layer PL3 of CD by the second objective optical system OBJ2. The second objective optical system OBJ2 conducts focusing and tracking by the 2-axis actuator AC arranged at its periphery. The reflected light flux modulated by an information pit on the information recording surface RL3, after transmits again the second objective optical system OBJ2 and the liquid crystal element LCD, is reflected by the second beam combiner, and converges on the light receiving surface of the photo-detector PD3. Then, by using the output signal of the photo-detector PD3, the information recorded in CD can be read.

Next, a structure of the objective optical system OBJ2 will be described. The second objective optical system OBJ2 is structured by an aberration correction element $t_1$ which is a plastic lens, and light converging element L2 which is an aspheric surface plastic lens of NA 0.85 having a function to light converge the laser light flux transmitted this aberration correction element L1 on the information recording surface of the optical disk. On the optical surface S1 of the laser light source side of the aberration correction element L1, the blaze type first diffractive structure DOE1 composed of a plurality of ring shaped zones whose sectional shape including the optical axis is saw-toothed shape is formed. Further, on the optical surface S2 of the optical disk side of the aberration correction element L1, the second diffractive structure DOE2 composed of a plurality of blaze type ring shaped zones composed of a plurality of ring shaped zones whose sectional shape including the optical axis is saw-toothed shape is formed. Further, the aberration correction element L1 and light converging element L2 have flange portions FL1, FL2 integrally formed in the periphery of respective optical function sections, and when mutual one-portions of the flange portions FL1 and FL2 are engaged and adhered to each other, they are integrated, further, the second objective optical system OBJ2 and the liquid crystal element LCD are integrated through the holding member B.

The first diffractive structure DOE1 is a structure to correct the spherical aberration due to the difference between the thickness $t_1$ of the protective layer PL1 of the high density optical disk HD and the thickness $t_2$ of the protective layer PL2 of DVD, and to finely correct such a spherical aberration, the first diffractive structure DOE1 is formed on the aspheric surface. Further, in the second objective optical system OBJ2, to correct the spherical aberration due to the difference between the thickness $t_1$ of the protective layer PL1 of the high density optical disk HD and the thickness $t_3$ of the protective layer PL3 of CD, the magnification m1 at the time of the recording/reproducing of the information on the high density optical disk HD, and the magnification m3 at the time of the recording/reproducing of the information on CD are made different, and at the time of the recording/reproducing of the information on CD, it is structured in such a manner that the divergent light flux is incident on the second objective optical system OBJ2. Further, as the diffraction order $n_{11}$ of a beam for the recording/reproducing of the high density optical disk HD, the diffraction order $n_{21}$ of a beam for the recording/reproducing of DVD, and the diffraction order $n_{31}$ of a beam for the recording/reproducing of CD, when $n_{11}=2$, $n_{21}=1$, $n_{31}=1$ are respectively selected, the high diffraction efficiency is secured in the wavelength ranges of respective optical disks.

In the first diffractive structure DOE1, because the ratio $\delta\phi_{A12}$ of the optical path length of the first light flux and the second light flux expressed by the above expression (2) satisfies $$INT(\delta\phi_{A12})-\delta\phi_{A12}<0. \tag{21}$$

when the wavelength of the light flux incident on the first diffractive structure DOE1 shifts from the designed wavelength $\lambda_1$ of the high density optical disk side to the long wavelength side by $\Delta\lambda$, it has the spherical aberration characteristic by which the spherical aberration changes to the over correction direction. Therefore, when the environmental temperature rises, because the spherical aberration change in the over correction direction generated in the light converging element L2, and by the wavelength shift to the long wavelength side of the blue violet semiconductor laser LD1 following the environmental temperature rise, the spherical aberration change in the over correction direction generated in the first diffractive structure DOE1, are added, when the environmental temperature rises, it is difficult to conduct the stable recording/reproducing on the high density optical disk HD.

To control the wavelength dependency of the spherical aberration of such a first diffractive structure, and to increase the recording/reproducing characteristic for the high density optical disk HD when the environmental temperature changes, in the second objective optical system OBJ2, the second diffractive structure DOE2 is formed on the optical surface S2 of the optical disk side of the aberration correction element L1, and as the diffraction order $n_{12}$ of the beam for the recording/reproducing of the high density optical disk HD, and the diffraction order $n_{22}$ of the beam for the recording/reproducing of DVD, $n_{12}=10$, $n_{22}=6$ are respectively selected so that a ratio of $\delta\phi_{B12}$ of the optical path length of the first light flux and the second light flux, expressed by the above expression (3), satisfies $$INT(\delta\phi_{B12})-\delta\phi_{B12}<0. \tag{22}$$

The second diffractive structure DOE2 has the spherical aberration characteristic in which the spherical aberration changes to the over correction direction by the shift of the incident light flux to the long wavelength side. Hereupon, when the third light flux of wavelength $\lambda_3$ is incident on the second diffractive structure DOE2, the 5-order diffraction light isz generated ($n_{32}=5$).

When the spherical aberration characteristic of the first diffractive structure DOE1 is controlled by the second diffractive structure DOE2 having the spherical aberration characteristic reversal to the first diffractive structure DOE1, the spherical aberration characteristic in which the spherical aberration changes to the under correction direction can be given to the second objective optical system OBJ2, when the wavelength shifts from the designed wavelength $\lambda_1$ of the high density optical disk side to the long wavelength side by $\Delta\lambda$.

As this result, when the environmental temperature rises, because the spherical aberration change in the over correction direction generated in the light converging element L2, and the spherical aberration change in the under correction direction generated by the wavelength shift to the long wavelength side of the blue violet semiconductor laser LD1 following the environmental temperature rise, are cancelled out, the recording/reproducing characteristic for the high density optical disk HD when the environmental temperature changes can be improved.

In the present embodiment, the aperture switching when the recording/reproducing of the information is conducted on DVD and CD, is structured in such a manner that it is conducted by the liquid crystal element LCD, however, such a technology is written in, for example, Tokkaihei No. 10-20263, and because it is a publicly known technology, the detailed description will be omitted herein.

EXAMPLE

Examples which are preferred to the above embodiments will be described below. Aspheric surface in each Example is, when a deformation amount from the plane tangent to an apex of the surface is X (mm), the height in the direction perpendicular to the optical axis is h (mm), and the radius of curvature is r (mm), expressed by the following Math-1. Where, κ is a conical coefficient, and A2i is an aspheric surface coefficient.

$$X = \frac{h^2/r}{1+\sqrt{1-(1+\kappa)h^2/r^2}} + \sum_{i=2}^{10} A_{2i}h^{2i} \qquad \text{(Math-1)}$$

Further, the ring shaped zone structure as the diffractive structure in each Example is expressed by the optical path difference added to the transmission wave-front by this ring shaped zone structure. Such an optical path difference is, when the height in the direction perpendicular to the optical axis is h (mm), $B_{2j}$ is an optical path difference function coefficient, a wavelength of the incident light flux is λ (nm), and a production wavelength is $\lambda_B$ (nm), expressed by the optical path difference function $\phi_b$ defined by the following Math-2.

$$\phi_b = \lambda/\lambda_B \times n \times \sum_{j=1} B_{2j}h^{2j} \qquad \text{(Math-2)}$$

Example 1

Figure 4:
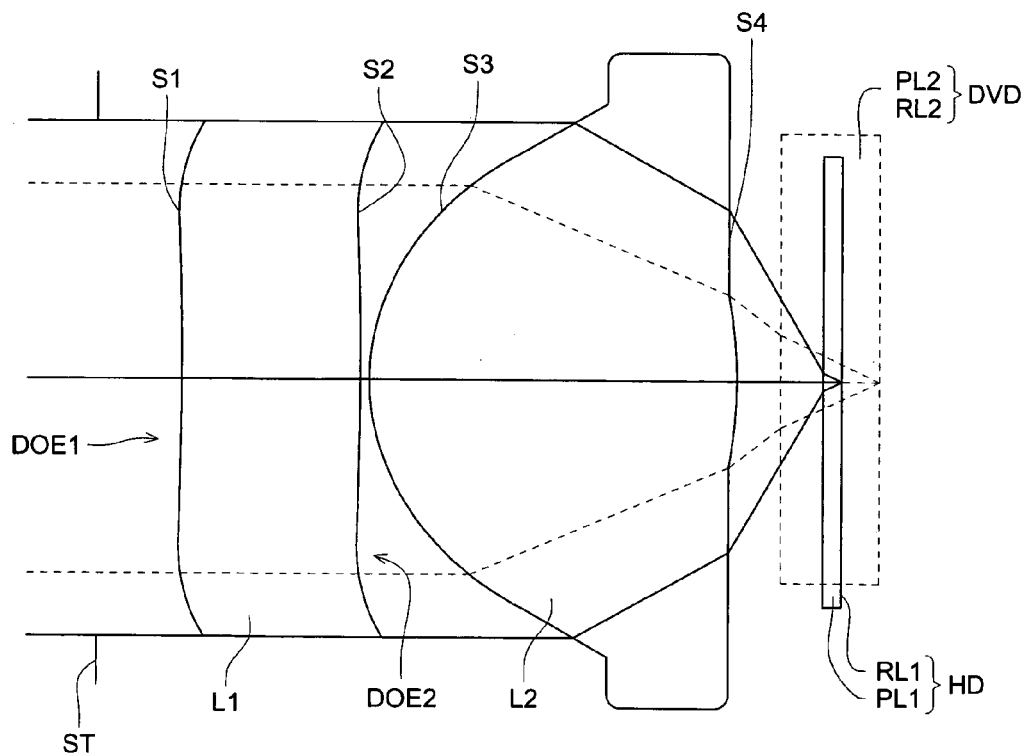
FIG. 4 is a sectional view of an objective lens of Example 1.

The present Example is an optical element appropriate as the first objective optical system OBJ1 in the above optical pick-up device PU1, the lens data is shown in Table 1, and the optical path view is shown in FIG. 4. The optical element of the present Example is structured by the spherical aberration correction element L1 which is a plastic lens, in which the first diffractive structure DOE1 is formed on the optical surface S1 of the laser light source side, and the second diffractive structure DOE2 is formed on the optical surface S2 of the optical disk side, and the light converging element L2 which is a glass lens both surfaces of which are aspheric surfaces. Hereupon, hereinafter (including the lens data in Table), exponential of 10 (for example, $2.5\times10^{-3}$) is expressed by using E (for example, 2.5E-3). Further, the following signs express that, r (mm) is a paraxial radius of curvature, $d_1$ (mm) is an interval on optical axis when the high density optical disk HD is used, $d_2$ (mm) is an interval on optical axis when DVD is used, $N_{\lambda1}$ is a refractive index in wavelength $\lambda_1$, $N_{\lambda2}$ is a refractive index in wavelength $\lambda_2$, and $v_d$ is Abbe's number in d-line.

TABLE 1

(Paraxial data)

| Surface No. | r (mm) | $d_1$ (mm) | $d_2$ (mm) | $N_{\lambda1}$ | $N_{\lambda2}$ | $v_d$ |
|---|---|---|---|---|---|---|
| OBJ | | ∞ | ∞ | | | |
| ST | | 0.5000 | 0.5000 | | | |
| 1 | −21.0284 | 1.0000 | 1.0000 | 1.5247 | 1.5065 | 56.5 |
| 2 | ∞ | 0.0500 | 0.0500 | | | |
| 3 | 1.2369 | 2.1400 | 2.1400 | 1.6227 | 1.6032 | 61.2 |
| 4 | −3.3104 | 0.5311 | 0.2652 | | | |
| 5 | ∞ | 0.1000 | 0.6000 | 1.61950 | 1.5772 | 30.0 |
| 6 | ∞ | | | | | |

TABLE 1-continued (Aspheric surface coefficient)

| | 1st surface | 2nd surface | 3rd surface | 4th surface |
|---|---|---|---|---|
| κ | 0.0000E+00 | 0.0000E+00 | −0.65471E+00 | −0.111004E+03 |
| A4 | 1.2698E−02 | 1.5697E−02 | 0.15588E−01 | 0.17200E+00 |
| A6 | 4.7005E−03 | 5.3490E−03 | −0.10498E−02 | −0.29168E+00 |
| A8 | 1.5410E−03 | 1.5839E−03 | 0.10874−E01 | 0.37347E+00 |
| A10 | −2.4906E−04 | −9.5714E−05 | −0.10146E−01 | −0.35736E+00 |
| A12 | 0.0000E+00 | 0.0000E+00 | 0.30385E−02 | 0.19402E+00 |
| A14 | 0.0000E+00 | 0.0000E+00 | 0.40266E−02 | −0.43722E−01 |
| A16 | 0.0000E+00 | 0.0000E+00 | −0.44036E−02 | 0.0000E+00 |
| A18 | 0.0000E+00 | 0.0000E+00 | 0.17036E−02 | 0.0000E+00 |
| A20 | 0.0000E+00 | 0.0000E+00 | −0.25435E−03 | 0.0000E+00 |

(Diffraction order, production wavelength, optical path difference function coefficient)

| | 1st surface | 2nd surface |
|---|---|---|
| $n_1/n_2$ | 2/1 | 3/2 |
| λB | 390 nm | 420 nm |
| B2 | −6.0000E−03 | 0.0000E+00 |
| B4 | 4.2364E−03 | −3.5937E−03 |
| B6 | −1.5771E−04 | 1.1204E−06 |
| B8 | 1.0076E−03 | −7.3328E−04 |
| B10 | −1.6075E−04 | 8.7910E−05 |

The optical specification at the use of the high density optical disk is, the wavelength $\lambda_1$=405 nm, thickness $t_1$ of the protective layer PL1=0.1 mm, numerical aperture $NA_1$ 0.85, focal distance $f_1$=1.765 mm, magnification $m_1$=0, and the optical specification at the use of DVD is, the wavelength $\lambda_2$=655 nm, thickness $t_2$ of the protective layer PL2=0.6 mm, numerical aperture $NA_2$=0.65, focal distance $f_2$=1.819 mm, magnification $m_2$=0.

The first diffractive structure DOE1 is a structure which generates the second diffraction light to the wavelength $\lambda_1$ and generates the first diffraction light to the wavelength $\lambda_2$, and whose production wavelength $\lambda_B$ is 390 nm. The diffraction efficiencies to $\lambda_1$ and $\lambda_2$ are respectively 97.7%, 93.3%, and it has the high diffraction efficiency also to any wavelength.

Further, the second diffractive structure DOE2 is a structure which generates the third diffraction light to the wavelength λ1, and generates the second diffraction light to the wavelength λ2, and whose production wavelength λB is 420 nm. The diffraction efficiencies to λ1 and λ2 are respectively 95.0%, 94.1%, and it has the high diffraction efficiency also to any wavelength.

In Table 2, λ1 (nm) of the optical element of the present Example, and RMS value (total sum of the spherical aberration component not larger than the ninth-order) of the spherical aberration on the best image surface to λ1±5 (nm) are shown. In Table 2, "comparative example" is an optical element which has the same designed wavelength as the optical element of the present Example, the same focal distance, the same numerical aperture, and the same working distance, and on which the second diffractive structure DOE2 is not formed. From this Table, when the optical element of the present Example is used as the objective optical system, the allowance of the blue violet laser light source and the red laser light source to the oscillation wavelength can be secured sufficiently large.

TABLE 2

|  | Example 1 | Comparative example |
|---|---|---|
| $\lambda_1$ | 0.001λ RMS | 0.001λ RMS |
| $\lambda_1$ + 5 (nm) | 0.002λ RMS | 0.375λ RMS |
| $\lambda_1$ − 5 (nm) | 0.002λ RMS | 0.386λ RMS |

Example 2

Figure 5:
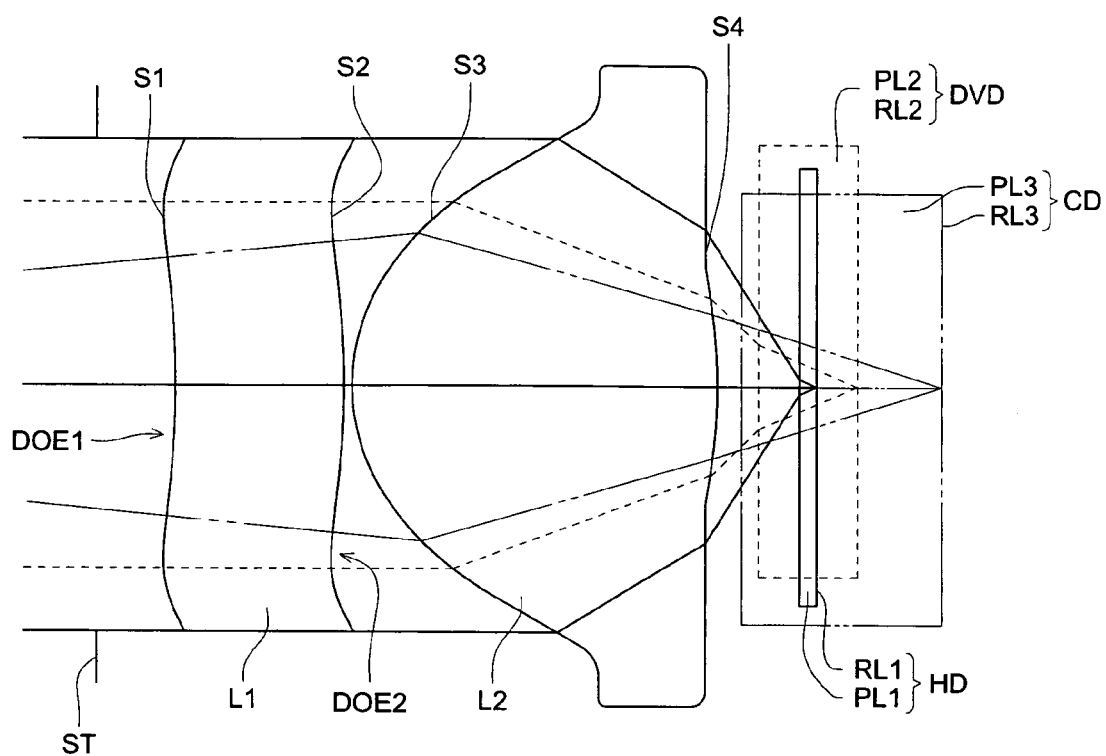
FIG. 5 is a sectional view of an objective lens of Example 2.

The present Example is an optical element appropriate as the ssecond objective optical system OBJ2 in the above optical pick-up device PU2, the lens data is shown in Table 3, and the optical path view is shown in FIG. 5. The optical element of the present Example is structured by the spherical aberration correction element L1 which is a plastic lens, in which the first diffractive structure DOE1 is formed on the optical surface S1 of the laser light source side, and the second diffractive structure DOE2 is formed on the optical surface S2 of the optical disk side, and the light converging element L2 which is a plastic lens both surfaces of which are aspheric surfaces.

The optical specification at the use of the high density optical disk is, the wavelength $\lambda_1$=405 nm, thickness $t_1$ of the protective layer PL1=0.1 mm, numerical aperture $NA_1$=0.85, focal distance $f_1$=1.765 mm, magnification $m_1$=0, and the optical specification at the use of DVD is, the wavelength $\lambda_2$=655 nm, thickness $t_2$ of the protective layer PL2=0.6 mm, numerical aperture $NA_2$=0.65, focal distance $f_2$=1.822 mm, magnification $m_2$=0, and the optical specification at the use of CD is, the wavelength $\lambda_3$=785 nm, thickness $t_3$ of the protective layer PL3=1.2 mm, numerical aperture $NA_3$=0.45, focal distance $f_3$=1.823 mm, magnification $m_3$=−0.173, and the designed reference temperature is 25° C.

The first diffractive structure DOE1 is a structure which generates the second diffraction light to the wavelength $\lambda_1$, and generates the first diffraction light to the wavelength $\lambda_2$, and generates the first diffraction light to the wavelength $\lambda_3$, whose production wavelength $\lambda_B$ is 390 nm. The diffraction efficiencies to $\lambda_1$, $\lambda_2$ and $\lambda_3$ are respectively 97.7%, 93.3%, and 99.2%, and it has the high diffraction efficiency also to any wavelength.

Further, the second diffractive structure DOE2 is a structure which generates the 10th-order diffraction light to the

TABLE 3

(Paraxial data)

| Surface No. | r (mm) | $d_1$ (mm) | $d_2$ (mm) | $d_3$ (mm) | $N_{\lambda 1}$ | $N_{\lambda 2}$ | $N_{\lambda 3}$ | $v_d$ |
|---|---|---|---|---|---|---|---|---|
| OBJ |  | ∞ | ∞ | 10.450 |  |  |  |  |
| ST |  | 0.5000 | 0.5000 | 0.5000 |  |  |  |  |
| 1 | −6.2326 | 1.0000 | 1.0000 | 1.0000 | 1.5247 | 1.5065 | 1.5050 | 56.5 |
| 2 | −9.7062 | 0.0500 | 0.0500 | 0.0500 |  |  |  |  |
| 3 | 1.1833 | 2.2500 | 2.2500 | 2.2500 | 1.5601 | 1.5407 | 1.5372 | 56.3 |
| 4 | −1.9045 | 0.5008 | 0.2698 | 0.2652 |  |  |  |  |
| 5 | ∞ | 0.1000 | 0.6000 | 1.2000 | 1.6195 | 1.5772 | 1.5704 | 30.0 |
| 6 | ∞ |  |  |  |  |  |  |  |

(Aspheric surface coefficient)

|  | 1st surface | 2nd surface | 3rd surface | 4th surface |
|---|---|---|---|---|
| κ | −1.7386E+01 | −1.3310E+01 | −0.69846E+00 | −0.44660E+02 |
| A4 | 1.3816E−02 | 2.2877E−02 | 0.17884E−01 | 0.17603E+00 |
| A6 | 4.6880E−03 | 1.3675E−02 | 0.64131E−02 | −0.27548E+00 |
| A8 | 2.5516E−03 | −1.6114E−03 | −0.35779E−02 | 0.31965E+00 |
| A10 | 1.8830E−04 | 1.4881E−03 | 0.44492E−02 | −0.29680E+00 |
| A12 | 0.0000E+00 | 0.0000E+00 | −0.61774E−03 | 0.16620E+00 |
| A14 | 0.0000E+00 | 0.0000E+00 | −0.80581E−03 | −0.39257E−01 |
| A16 | 0.0000E+00 | 0.0000E+00 | 0.16547E−03 | 0.0000E+00 |
| A18 | 0.0000E+00 | 0.0000E+00 | 0.21142E−03 | 0.0000E+00 |
| A20 | 0.0000E+00 | 0.0000E+00 | −0.72030E−04 | 0.0000E+00 |

(Diffraction order, production wavelength, optical path difference function coefficient)

|  | 1st surface | 2nd surface |
|---|---|---|
| $n_1/n_2/n_3$ | 2/1/1 | 10/6/5 |
| λB | 390 nm | 405 nm |
| B2 | −2.0000E−02 | 2.6868E−03 |
| B4 | 6.3584E−03 | −1.4355E−03 |
| B6 | 3.7364E−04 | −6.3552E−04 |
| B8 | 7.0863E−04 | 9.0151E−05 |
| B10 | 6.1334E−05 | −8.3045E−05 | wavelength $\lambda_1$, and generates the 6th-order diffraction light to the wavelength $\lambda_2$, and generates the 5th-order diffraction light to the wavelength $\lambda_3$, and whose production wavelength $\lambda_B$ is 405 nm. The diffraction efficiencies to $\lambda_1$, $\lambda_2$ and $\lambda_3$ are respectively 100%, 99.7%, 99.6%, and it has the high diffraction efficiency also to any wavelength.

In Table 4, RMS value (total sum of the spherical aberration component not larger than the 9th-order) of the wave-front aberration on the best image surface at the time of use of the high density optical disk HD at temperature 25° C. and 55° C. of the optical element of the present Example is shown. However, it is assumed that an amount of the wavelength shift following the temperature rise of the blue violet semiconductor laser LD1 is +0.05 nm/degree, and refractive index changing amounts of the aberration correction element L1 and the light converging element L2 are respectively, $-1.08 \times 10^{-4}$/degree, and $-0.9 \times 10^{-4}$/degree. In Table 2, "comparative example" is an optical element which has the same designed wavelength as the optical element of the present Example, the same focal distance, the same numerical aperture, and the same working distance, and on which the second diffractive structure DOE2 is not formed. From this Table, when the optical element of the present Example is used as the objective optical system, the recording/reproducing characteristic for the high density optical disk HD when the environmental temperature changes, can be improved.

TABLE 4

|  | Example 1 | Comparative example |
|---|---|---|
| 25° C. | 0.001λ RMS | 0.002λ RMS |
| 55° C. | 0.031λ RMS | 0.419λ RMS |

Example 3

Figure 6:
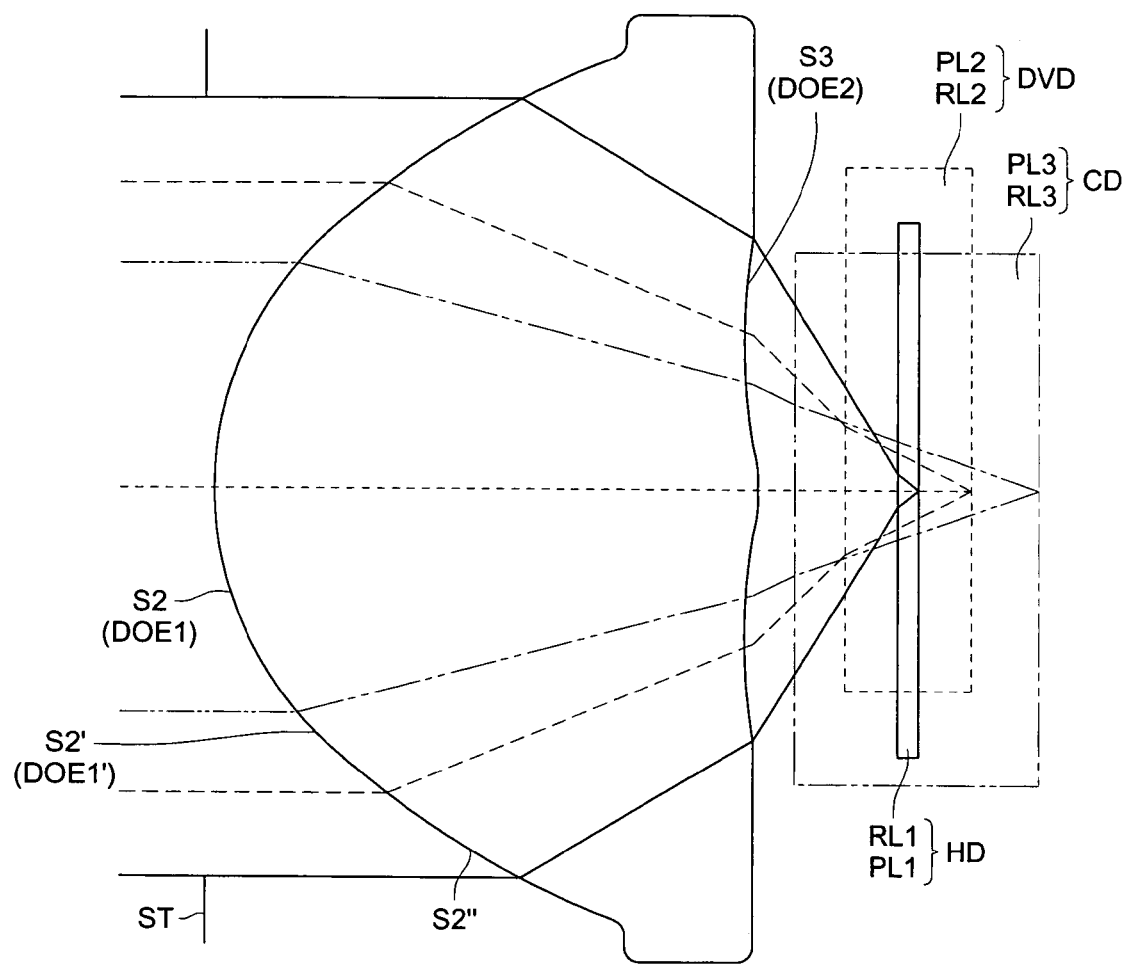
FIG. 6 is a sectional view of an objective lens of Example 3.

In the above-described Examples 1 and 2, the objective optical systems OBJ1 and OBJ2 are structured by the aberration correction element Li and the light converging element L2. However, the present Example has a structure in which the first diffractive structure DOE1 and the second diffractive structure DOE2 are formed on the light converging element which is a plastic lens, and is an objective optical system by which the recording/reproducing of the infonnation can be adequately conducted on the high density optical disk HD, DVD, and CD. The lens data of the present example is shown in Table 5 and the optical path veiw is shown in FIG. 6.

TABLE 5

(Paraxial data)

| Surface No. | r (mm) | $d_1$ (mm) | $d_2$ (mm) | $d_3$ (mm) | $N_{\lambda 1}$ | $N_{\lambda 2}$ | $N_{\lambda 3}$ | $\nu_d$ |
|---|---|---|---|---|---|---|---|---|
| OBJ |  | ∞ | ∞ | 55.000 |  |  |  |  |
| 1 (φ) |  | 0.0 (φ3.74 mm) | 0.0 (φ2.94 mm) | 0.0 (φ2.14 mm) |  |  |  |  |
| 2 | 1.4707 | 2.680 | 2.680 | 2.680 | 1.5609 | 1.5420 | 1.5384 | 56.5 |
| 2' | 1.4960 | 0.000 | 0.000 | 0.000 |  |  |  |  |
| 2" | 1.4909 | 0.000 | 0.000 | 0.000 |  |  |  |  |
| 3 | −3.2474 | 0.726 | 0.475 | 0.211 |  |  |  |  |
| 4 | ∞ | 0.0875 | 0.6 | 1.2 | 1.6184 | 1.5773 | 1.5709 | 30.0 |
| 5 | ∞ |  |  |  |  |  |  |  |

(Aspheric surface coefficient)

|  | 2nd surface (0 mm ≦ h ≦ 1.1 mm) | 2'nd surface (1.1 mm < h ≦ 1.5 mm) | 2"nd surface (1.5 mm < h < 1.87 mm) | 3rd surface |
|---|---|---|---|---|
| κ | −7.0427E−01 | −6.6076E−01 | −6.5972E−01 | −8.0855E+01 |
| A4 | 7.4223E−03 | 8.3930E−03 | 7.8024E−03 | 1.3795E−01 |
| A6 | −2.0190E−03 | −1.6207E−03 | −1.9518E−03 | −1.0111E−01 |
| A8 | 2.4523E−03 | 2.8973E−03 | 2.8832E−03 | 7.2824E−02 |
| A10 | −7.3015E−04 | −1.4249E−03 | −1.3937E−03 | −4.4906E−02 |
| A12 | −7.0596E−05 | 2.2693E−04 | 2.5822E−04 | 1.3758E−02 |
| A14 | 2.3442E−04 | 2.2356E−04 | 2.3117E−04 | −1.4902E−03 |
| A16 | −1.6860E−04 | −1.6524E−04 | −1.7041E−04 | 0.0000E+00 |
| A18 | 4.4733E−05 | 4.8206E−05 | 4.4665E−05 | 0.0000E+00 |
| A20 | −4.4166E−06 | −5.4013E−06 | −4.2425E−06 | 0.0000E+00 |

(Diffraction order, production wavelength, optical path difference function coefficient)

|  | 2nd surface (0 mm ≦ h ≦ 1.1 mm) | 2'nd surface (1.1 mm < h ≦ 1.5 mm) | 3rd surface |
|---|---|---|---|
| $n_1/n_2/n_3$ | 1/1/1 | 0/1/0 | 10/6/5 |
| λB | 550 nm | 658 nm | 408 nm |
| B2 | 4.4371E−03 | 2.6114E−03 | −2.8868E−03 |
| B4 | −1.6945E−03 | −2.0837E−03 | −3.5861E−03 |

TABLE 5-continued

| | | | |
|---|---|---|---|
| B6  | −1.2404E−03 | 8.4202E−04  | 6.5773E−04  |
| B8  | 9.2878E−04  | −3.8289E−04 | 5.3262E−04  |
| B10 | −2.8718E−04 | 4.0704E−05  | −1.2290E04  |

φAperture diameter
2': dislocation from 2nd surface to 2'nd surface
2": dislocation from 2'nd surface to 2"nd surface The optical specification at the time of use of the high density optical disk HD is, the wavelength $\lambda_1$=408 nm, thickness $t_1$ of the protective layer PL1=0.0875 mm, numerical aperture $NA_1$=0.85, focal distance $f_1$=2.19 mm, magnification $m_1$=0, the optical specification at the time of use of DVD is, the wavelength $\lambda_2$=658 nm, thickness $t_2$ of the protective layer PL2=0.6 mm, numerical aperture $NA_2$=0.66, focal distance $f_2$=2.26 mm, magnification $m_2$=0, and the optical specification at the time of use of CD is, the wavelength $\lambda_3$=785 nm, thickness $t_3$ of the protective layer PL3=1.2 mm, numerical aperture $NA_3$=0.46, focal distance $f_3$=2.28 mm, magnification $m_3$=−0.043, and the designed reference temperature is 25° C.

In the objective optical system of Example 3, the optical surface on the light source side is divided into 3 ranges of the second surface S2 (central range) including the optical axis, the 2' surface S2' (the 1st peripheral range) of its periphery, further, the 2" surface S2" (the 2nd peripheral range) of its periphery. Hereupon, the 2nd surface is a range corresponding to a range within the numerical aperture NA3, the 2' surface is a range corresponding to a range from the numerical aperture NA3 to the numerical aperture NA2, and the 2" surface is a range corresponding to a range from the numerical aperture NA2 to the numerical aperture NA1.

Herein, the first diffractive structure DOE1 is formed on the second surface, and this diffractive structure DOE1 generates the first-order diffraction light to the wavelength $\lambda_1$, the first-order diffraction light to the wavelength $\lambda_2$, and first-order diffraction light to the wavelength $\lambda_3$, and its production wavelength $\lambda_B$ is 550 nm. The diffraction efficiencies to $\lambda_1$, $\lambda_2$, and $\lambda_3$ are respectively 60%, 91%, and 72%.

Further, the first diffractive structure DOE1' is formed on the 2surface, and this diffractive structure DOE1' generates the 0-order diffraction light to the wavelength $\lambda_1$, the first-order diffraction light to the wavelength $\lambda_2$, and 0-order diffraction light to the wavelength λ3, and its production wavelength $\lambda_B$ is 658 nm. The diffraction efficiencies to $\lambda_1$, $\lambda_2$, and $\lambda_3$ are respectively 100%, 88%, and 100%.

Further, the 2" surface is an aspheric surface on which the diffractive structure is not formed, and this aspheric surface shape is optimized so that the light flux of the wavelength $\lambda_1$ passing the 2" surface forms a good wave-front on the information recording surface of the high density optical disk HD.

In the objective optical system of the present example, the spherical aberration due to the difference among $t_1$, $t_2$ and $t_3$ is corrected by using the action of the first diffractive structure DOE1 in the second surface, and in the 2' surface, corrected by using the action of the first diffractive structure DOE1'.

Herein, a principle of the diffraction light generation in the first diffractive structure DOE1' will be described. The first diffractive structure DOE1' is a structure in which patterns whose sectional shape including the optical axis is stepwise, are arranged on the concentric circle, and a structure in which the step is shifted by the height for number of steps corresponding to the number of level surfaces, for each of the number A of predetermined level surfaces. One step difference of the step is the depth of 2 times of the wavelength $\lambda_1$ in the optical path difference conversion, and it is preferable that a number A of predetermined level surfaces is any one of 4, 5, 6.

When one step difference of the step is set to the depth of 2 times of the wavelength $\lambda_1$ in the optical path difference conversion, because the wave-front of the first light flux passed the adjoining level surfaces is superimposed on each other shifted by 2 wavelengths, it can be transmitted as it is, without being subjected to the diffraction action. Further, by this step difference, the optical path difference added to the second light flux is 1.2 times of the wavelength λ2. Because the effective optical path difference from which the optical path difference for 1 wavelength which is an equal phase, is subtracted is 0.2 times of the wavelength $\lambda_2$, when a number A of level surfaces is set to any one of 4, 5, 6, the optical path difference of the second light flux within one pattern is almost 1 time of the wavelength $\lambda_2$. In this manner, when the pattern which generates the optical path difference of almost 1 time of the wavelength $\lambda_2$ is periodically arranged, the second light flux can be diffracted in the 1st-order direction in a high diffraction efficiency, and the diffractive structure by which only the second light flux is selectively diffracted, can be obtained. In this case, when the number A of the level surfaces is set to 5, because the optical path difference of the second light flux in one pattern can be most approached to 1 time of the wavelength $\lambda_2$, the transmission of the second light flux can be secured at highest.

Hereupon, in the first diffractive structure DOE1', the diffraction efficiency of the diffraction light of the second light flux depends on only Abbe's number of the material, and does not depend on the refractive index. Accordingly, for the refractive index, there is comparatively a degree of freedom, however, as a value of the refractive index is decreased, the step difference becomes deep, and because it is difficult that the shape of step is accurately produced, when there are a plurality of materials having the same Abbe's number, it is preferable that the material whose refractive index is largest, is selected.

Hereupon, because, in the first diffractive structure DOE1, it is the design which is taken a serious view of the diffraction efficiencies of the wavelength $\lambda_2$ and the wavelength $\lambda_3$, the diffraction efficiency of the wavelength $\lambda_1$ becomes 60%. However, because the diffraction efficiency (transmission) to the wavelength λ1 of the first diffractive structure DOE1' is made 100%, and the second peripheral range is made an aspheric surface on which the diffractive structure is not formed, the diffraction efficiency of the wavelength $\lambda_1$ calculated by the area weighted mean of each range becomes 86%, and the recording or reproducing can be conducted on the high density optical disk HD at high speed.

As described above, because the numerical aperture NA1 of the high density optical disk HD is larger than the numerical aperture NA3 of CD, when it is considered in the whole effective diameter of the wavelength λ1, the decrease of the diffraction efficiency of the first diffractive structure DOE1 does not affect so much.

Further, on the optical surface (the third surface) on the optical disk side, the second diffractive structure DOE2 is formed, and this second diffractive structure DOE2 generates 10-order diffraction light to the wavelength $\lambda_1$, 6-order diffraction light to the wavelength $\lambda_2$, and 5-order diffraction light to the wavelength $\lambda_3$, and the production wavelength $\lambda_B$ is 408 nm. The diffraction efficiencies to $\lambda_1$, $\lambda_2$ and $\lambda_3$, are respectively 100%, 100%, 100%.

In Table 6, RMS value (total sum of the spherical aberration components not larger than 9-order) of the wave-front aberration on the best image surface when the high density optical disk HD is used at the temperature 25° C. and 55° C. of the objective optical system of the present example, is shown. However, the wavelength shift amount following the temperature rise of the blue violet semiconductor laser LD1 is assumed to be +0.05 nm/° C., and the refractive index changing amount following the temperature rise is $-0.9 \times 10^{-4}$/° C. In Table 6, the "Comparative Example" is an objective optical system which has the same designed wavelength, same focal distance, same numerical aperture, same operating distance, as the objective optical system of the present example, and in which the first diffractive structure DOE1 and the first diffractive structure DOE1' are not formed. From this table, it can be said that the objective optical system of the present example is excellent in the recording/reproducing characteristic for the high density optical disk hd when the environmental temperature changes.

TABLE 6

|  | Example 3 | Comparative example |
|---|---|---|
| 25° C. | 0.002λ RMS | 0.002λ RMS |
| 55° C. | 0.008λ RMS | 0.168λ RMS |

What is claimed is:

1. A diffractive optical element, comprising:
   an optical surface having a first diffractive structure to generate $n_{11}$-th order diffracted ray when a first light flux having a wavelength λ1 (nm) comes in and to generate $n_{21}$-th order diffracted ray ($n_{11} \geq n_{21}$) when a second light flux having a wavelength λ2 (nm) (λ2>λ1) comes in; and
   an optical surface having a second diffractive structure to generate $n_{12}$-th order diffracted ray when the first light flux having the wavelength λ1 (nm) comes in and to generate $n_{22}$-th order diffracted ray ($n_{12} \geq n_{22}$) when the second light flux having the wavelength λ2 (nm) (λ2>λ1) comes in;
   wherein the diffractive optical element satisfies the following formula (1):

$$\delta\varphi_{A12} \neq \delta\varphi_{B12} \quad (1)$$

where, $$\delta\varphi_{A12} = \{n_{11} \cdot \lambda_1/(N_{11}-1)\}/\{n_{21} \cdot \lambda_2/(N_{21}-1)\} \quad (2)$$

$$\delta\varphi_{B12} = \{n_{12} \cdot \lambda_1/(N_{12}-1)\}/\{n_{22} \cdot \lambda_2/(N_{22}-1)\} \quad (3)$$

$N_{11}$, $N_{21}$ are refractive index of the first diffractive structure respectively for the wavelength of $\lambda_1$ and $\lambda_2$, and $N_{12}$, $N_{22}$ are refractive index of the second diffractive structure respectively for the wavelength of $\lambda_1$ and $\lambda_2$.

2. The diffractive optical element of claim 1, wherein the diffractive optical element satisfies the following formula (2):

$$n_{11} \neq n_{12} \quad (4)$$

3. The diffractive optical element of claim 1, wherein the diffractive optical element satisfies the following formula (5):

$$\{INT(\delta\varphi_{A12})-\delta\varphi_{A12}\} \cdot \{INT(\delta\varphi_{B12})-\delta\varphi_{B12}\} < 0 \quad (5)$$

where INT(X) represents an integer closest to X.

4. The diffractive optical element of claim 1, wherein the diffractive optical element satisfies one of the following formulas (6) and (7):

$$|INT(\delta\varphi_{A12})-\delta\varphi_{A12}| < 0.4 \quad (6)$$

$$|INT(\delta\varphi_{B12})-\delta\varphi_{B12}| < 0.4 \quad (7)$$

5. The diffractive optical element of claim 1, wherein both the first diffractive structure and the second diffractive structure comprise a plurality of concentric ring-shaped zones divided with steps formed along an optical axis direction and the diffractive optical element satisfies the following formula (8):

$$d_1 \neq d_2 \quad (8)$$

where $d_1$ is the depth of a step located closest to the optical axis among the steps of the first diffractive structure, and $d_2$ is the depth of a step located closest to the optical axis among the steps of the second diffractive structure.

6. The diffractive optical element of claim 1, wherein the diffractive optical element satisfies the following formulas (9) and (10):

$$|INT(\delta\varphi_{A12})-\delta\varphi_{A12}| > 0.07 \quad (9)$$

$$|INT(\delta\varphi_{B12})-\delta\varphi_{B12}| < 0.07 \quad (10)$$

7. The diffractive optical element of claim 1, wherein the diffractive optical element satisfies the following formulas (11) to (13):

$$\lambda_2/\lambda_1 > 1.3 \quad (11)$$

$$n_{11} > n_{21} \quad (12)$$

$$n_{12} > n_{22} \quad (13)$$

8. The diffractive optical element of claim 1, wherein when the wavelength $\lambda_1$ is within a range of 350 (nm) to 450 (nm), the wavelength $\lambda_2$ is within a range of 600 (nm) to 700 (nm) and i is 1 or 2, the combination ($n_{1i}$, $n_{2i}$) of the diffraction order $n_{1i}$ and the diffraction order $n_{2i}$ satisfies the following formula (except that combinations includes $n_{11}=n_{12}$):
   ($n_{1i}$, $n_{2i}$)=(1, 1), (2, 1), (3, 2), (4, 2), (5, 3), (6, 4), (7, 4), (8, 5), (9, 6) or (10, 6).

9. The diffractive optical element of claim 1, wherein the first diffractive structure generates $n_{31}$-th order diffracted ray ($n_{21} \geq n_{31}$) when a third light flux having a wavelength λ3 (nm) (λ3>λ2) comes in and the second diffractive structure generates $n_{32}$-th order diffracted ray ($n_{22} \geq n_{32}$) when a third light flux having a wavelength λ3 (nm) (λ3>λ2) comes in.

10. The diffractive optical element of claim 9, wherein the diffractive optical element satisfies one of the following formulas (14) and (15):

$$|INT(\delta\varphi_{A13})-\delta\varphi_{A13}| < 0.4 \quad (14)$$

$$|INT(\delta\varphi_{B13})-\delta\varphi_{B13}| < 0.4 \quad (15)$$

where, $$\delta\phi_{A13} = \{n_{11} \cdot \lambda_1/(N_{11}-1)\}/\{n_{31} \cdot \lambda_3/(N_{31}-1)\} \quad (14)$$

$$\delta\phi_{B13} = \{n_{12} \cdot \lambda_1/(N_{12}-1)\}/\{n_{32} \cdot \lambda_3/(N_{32}-1)\} \quad (15)$$

$N_{11}$, $N_{31}$ are refractive index of the first diffractive structure respectively for the wavelength of $\lambda_1$ and $\lambda_3$, $N_{12}$, $N_{32}$ are refractive index of the second diffractive structure respectively for the wavelength of $\lambda_1$ and $\lambda_3$, and INT(X) represents an integer closest to X.

11. The diffractive optical element of claim 9, wherein when the wavelength $\lambda_1$ is within a range of 350 (nm) to 450 (nm), the wavelength $\lambda_2$ is within a range of 600 (nm) to 700 (nm), the wavelength $\lambda_3$ is within a range of 750 (nm) to 850 (nm) and i is 1 or 2, the combination $(n_{1i}, n_{2i}, N_{3i})$ of the diffraction order $n_{1i}$, the diffraction order $n_{2i}$ and the diffraction order $n_{3i}$ satisfies the following formula (except that combinations includes $n_{11}=n_{12}$)

$(n_{1i}, n_{2i}, N_{3i})=(2, 1, 1), (3, 2), (4, 2, 2), (6, 4, 3), (8, 5, 4)$ or $(10, 6, 5)$.

12. The diffractive optical element of claim 1, where the diffractive optical element is integrated with a single objective lens to converge a light flux.

13. An objective optical system to converge a first light flux having a wavelength $\lambda 1$ (nm) onto an information recording surface of a first optical information recording medium having a protective substrate having a thickness t1 and to converge a second light flux having a wavelength $\lambda 2$ (nm) ($\lambda 2 > \lambda 1$) onto an information recording surface of a second optical information recording medium having a protective substrate having a thickness t2 (t2$\geq$t1), comprising:

an optical surface having a first diffractive structure to generate $n_{11}$-th order diffracted ray when the first light flux comes in and to generate $n_{21}$-th order diffracted ray ($n_{11} \geq n_{21}$) when the second light flux comes in; and an optical surface having a second diffractive structure to generate $n_{12}$-th order diffracted ray when the first light flux having the wavelength $\lambda 1$ (nm) comes in and to generate $n_{22}$-th order diffracted ray ($n_{12} \geq n_{22}$) when the second light flux having the wavelength $\lambda 2$ (nm) ($\lambda 2 > \lambda 1$) comes in;

wherein the diffractive optical element satisfies the following formula (1):

$$\delta\phi_{A12} \neq \delta\phi_{B12} \quad (1)$$

where, $$\delta\phi_{A12} = \{n_{11} \cdot \lambda_1/(N_{11}-1)\}/\{n_{21} \cdot \lambda_2/(N_{21}-1)\} \quad (2)$$

$$\delta\phi_{B12} = \{n_{12} \cdot \lambda_1/(N_{12}-1)\}/\{n_{22} \cdot \lambda_2/(N_{22}-1)\} \quad (3)$$

$N_{11}$, $N_{21}$ are refractive index of the first diffractive structure respectively for the wavelength of $\lambda_1$, and $\lambda_2$, and $N_{12}$, $N_{22}$ are refractive index of the second diffractive structure respectively for the wavelength of $\lambda_1$ and $\lambda_2$.

14. The objective optical system of claim 13, wherein the objective optical system satisfies the following formula (2):

$$n_{11} \neq n_{12} \quad (4).$$

15. The objective optical system of claim 13, wherein the objective optical system satisfies the following formula (5):

$$\{INT(\delta\phi_{A12})-\delta\phi_{A12}\} \cdot \{INT(\delta\phi_{B12})-\delta\phi_{B12}\} < 0 \quad (5)$$

where INT(X) represents an integer closest to X.

16. The objective optical system of claim 13, wherein when the thickness of the protective substrate satisfies the following relationship of (t2>t1), the first diffractive structure has a function to correct spherical aberration caused by a difference in thickness between the thickness t1 and the thickness t2 and the second diffractive structure has a function to control a spherical aberration generated at the first diffractive structure when the wavelength $\lambda 1$ changes within a range of $\pm 10$ nm.

17. The objective optical system of claim 13, wherein when the thickness of the protective substrate satisfies the following relationship of (t2=t1), the first diffractive structure has a function to correct spherical aberration caused by wavelength dispersion due to a difference in wavelength between the wavelength $\lambda 1$ and the wavelength $\lambda 2$ and the second diffractive structure has a function to refrain a spherical aberration generated at the first diffractive structure to become smaller when the wavelength $\lambda 1$ changes within a range of $\pm 10$ nm.

18. The objective optical system of claim 17, wherein the second diffractive structure has a function to control a spherical aberration generated at the first diffractive structure when the wavelength $\lambda 1$ changes within a range of $\pm 10$ nm.

19. The objective optical system of claim 17, wherein the objective optical system has a spherical aberration characteristic in which a spherical aberration changes in an under correction direction when the wavelength $\lambda 1$ changes to a longer wavelength side within a range of $+10$ nm.

20. The objective optical system of claim 17, wherein the objective optical system comprises at least one plastic lens.

21. The objective optical system of claim 13, wherein the objective optical system satisfies one of the following formulas (6) and (7):

$$|INT(\delta\phi_{A12})-\delta\phi_{A12}| < 0.4 \quad (6)$$

$$|INT(\delta\phi_{B12})-\delta\phi_{B12}| < 0.4 \quad (7).$$

22. The objective optical system of claim 13, wherein both the first diffractive structure and the second diffractive structure comprise a plurality of concentric ring-shaped zones divided with steps formed along an optical axis direction and the objective optical system satisfies the following formula (8):

$$d_1 \neq d_2 \quad (8)$$

where $d_1$ is the depth of a step located closest to the optical axis among the steps of the first diffractive structure, and $d_2$ is the depth of a step located closest to the optical axis among the steps of the second diffractive structure.

23. The objective optical system of claim 13, wherein the objective optical system satisfies the following formulas (9) and (10):

$$|INT(\delta\phi_{A12})-\delta\phi_{A12}| > 0.07 \quad (9)$$

$$|INT(\delta\phi_{B12})-\delta\phi_{B12}| < 0.07 \quad (10).$$

24. The objective optical system of claim 13, wherein the objective optical system satisfies the following formulas (11) to (13):

$$\lambda_2/\lambda_1 > 1.3 \quad (11)$$

$$n_{11} > n_{21} \quad (12)$$

$$n_{12} > n_{22} \quad (13).$$

25. The objective optical system of claim 13, wherein when the wavelength $\lambda_1$ is within a range of 350 (nm) to 450 (nm), the wavelength $\lambda_2$ is within a range of 600 (nm) to 700 (nm) and i is 1 or 2, the combination $(n_{1i}, n_{2i})$ of the diffraction order $n_{1i}$ and the diffraction order $n_{2i}$ satisfies the following formula (except that combinations includes $n_{11}=n_{12}$):

$(n_{1i}, n_{2i})$=(1, 1), (2, 1), (3, 2), (4, 2), (5, 3), (6, 4), (7, 4), (8, 5), (9, 6) or (10, 6).

26. The objective optical system of claim 13, wherein the first diffractive structure generates $n_{31}$-th order diffracted ray ($n_{21} \geqq n_{31}$) when a third light flux having a wavelength $\lambda 3$ (nm) ($\lambda 3 > \lambda 2$) comes in and the second diffractive structure generates $n_{32}$-th order diffracted ray ($n_{22} \geqq n_{32}$) when a third light flux having a wavelength $\lambda 3$ (nm) ($\lambda 3 > \lambda 2$) comes in.

27. The objective optical system of claim 26, wherein the objective optical system satisfies one of the following formulas (14) and (15):

$$|INT(\delta\phi_{A13}) - \delta\phi_{A13}| < 0.4 \quad (14)$$

$$|INT(\delta\phi_{B13}) - \delta\phi_{B13}| < 0.4 \quad (15)$$

where, $$\delta\phi_{A13} = \{n_{11} \cdot \lambda_1/(N_{11}-1)\}/\{n_{31} \cdot \lambda_3/(N_{31}-1)\} \quad (16)$$

$$\delta\phi_{B13} = \{n_{12} \cdot \lambda_1/(N_{12}-1)\}/\{n_{32} \cdot \lambda_3/(N_{32}-1)\} \quad (17)$$

$N_{11}$, $N_{31}$ are refractive index of the first diffractive structure respectively for the wavelength of $\lambda_1$ and $\lambda_3$, $N_{12}$, $N_{32}$ are refractive index of the second diffractive structure respectively for the wavelength of $\lambda_1$ and $\lambda_3$, and INT(X) represents an integer closest to X.

28. The objective optical system of claim 26, wherein when the wavelength $\lambda_1$ is within a range of 350 (nm) to 450 (nm), the wavelength $\lambda_2$ is within a range of 600 (nm) to 700 (nm), the wavelength $\lambda_3$ is within a range of 750 (nm) to 850 (nm) and i is 1 or 2, the combination $(n_{1i}, n_{2i}, N_{3i})$ of the diffraction order $n_{1i}$, the diffraction order $n_{2i}$ and the diffraction order $n_{3i}$ satisfies the following formula (except that combinations includes $n_{11}=n_{12}$):

$(n_{1i}, n_{2i}, N_{3i})$=(2, 1, 1), (3, 2), (4, 2, 2), (6, 4, 3), (8, 5, 4) or (10, 6, 5).

29. The objective optical system of claim 13, where the objective optical system comprises a diffractive optical element including the optical surface having the first diffractive structure and the optical surface having the second diffractive structure and a converging optical element to converge the first light flux and the second light flux onto the information surface of the first optical information recording medium and the second optical information medium, and wherein the diffractive optical element and the converging optical element are integrated in one body.

30. An optical pickup apparatus, comprising:
a first light source to emit a first light flux having a wavelength $\lambda 1$ (nm);
a second light source to emit a second light flux having a wavelength $\lambda 2$ (nm) ($\lambda 2 > \lambda 1$); and
the objective optical system described in claim 13 to converge the first light flux onto an information recording surface of a first optical information recording medium having a protective substrate having a thickness t1 and to converge the second light flux onto an information recording surface of a second optical information recording medium having a protective substrate having a thickness t2 ($t2 \geqq t1$).

31. An optical information recording reproducing apparatus for conducting at least one of recording and reproducing information for a first optical recording medium and a second optical information recording medium, comprising:
the optical pickup apparatus described in claim 30.

\* \* \* \* \*